(12) United States Patent
Lee et al.

(10) Patent No.: US 12,650,797 B2
(45) Date of Patent: Jun. 9, 2026

(54) WEARABLE DEVICE FOR DISPLAYING VISUAL OBJECT, AND METHOD THEREOF

(71) Applicant: Samsung Electronics Co., Ltd., Suwon-si (KR)

(72) Inventors: Yongkoo Lee, Suwon-si (KR); Sooryuh Kim, Suwon-si (KR); Dongil Son, Suwon-si (KR); Saeah Oh, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 19/219,734

(22) Filed: May 27, 2025

(65) Prior Publication Data

US 2025/0284444 A1     Sep. 11, 2025

Related U.S. Application Data

(63) Continuation of application No. PCT/KR2023/020917, filed on Dec. 18, 2023.

(30) Foreign Application Priority Data

Dec. 20, 2022   (KR) ........................ 10-2022-0179368
Jan. 9, 2023   (KR) ........................ 10-2023-0002898

(51) Int. Cl.
*G06F 3/14*          (2006.01)
*G06F 3/01*          (2006.01)
(52) U.S. Cl.
CPC ................ *G06F 3/14* (2013.01); *G06F 3/011* (2013.01)
(58) Field of Classification Search
CPC .............. G02B 27/017; G02B 27/0172; G02B 2027/014; G06F 3/011; G06F 3/0481;
(Continued)

(56) References Cited

U.S. PATENT DOCUMENTS 9,219,901 B2   12/2015   Mulholland
10,122,985 B2   11/2018   Stafford
(Continued)

FOREIGN PATENT DOCUMENTS

JP          7549630 B2     9/2024
JP          7562836 B2     10/2024
(Continued)

OTHER PUBLICATIONS

International Search Report for PCT/KR2023/020917 mailed Apr. 4, 2024, 5 pages, with English translation.
(Continued)

*Primary Examiner* — Yaron Cohen
(74) *Attorney, Agent, or Firm* — Nixon & Vanderhye, P.C.

(57)     ABSTRACT

A processor, comprising processing circuitry, of an electronic device may, individually and/or collectively, be configured to cause the electronic device to: detect a direction of the electronic device using a sensor, while executing a first application for providing a virtual space; display, on the entire display area of a display, a first screen corresponding to a portion of the virtual space, the portion corresponding to the detected direction of the electronic device; determine, using the sensor, whether a position of the electronic device is included in a first range, the first range ensuring maintenance of provision of a virtual reality service based on the virtual space; display, on the entire display area of the display, a second screen provided from a second application based on detection of a position of the electronic device included in a second range distinguished from the first range; and display, on the second screen, a visual object associated with the virtual space, the visual object having a reduced size on the second screen based on a portion of the display area.

20 Claims, 16 Drawing Sheets

(58) Field of Classification Search
CPC .......... G06F 3/04815; G06F 3/01; G06F 3/14;
G06F 3/04845; G06F 3/04842; G06F
3/04817; G06F 3/00
See application file for complete search history.

(56) References Cited

U.S. PATENT DOCUMENTS

| | | | |
|---|---|---|---|
| 10,156,721 | B2 | 12/2018 | Scott et al. |
| 10,203,762 | B2 | 2/2019 | Bradski et al. |
| 10,845,869 | B2 | 11/2020 | Lee |
| 10,931,941 | B2 | 2/2021 | Valdivia et al. |
| 12,039,221 | B2 | 7/2024 | Mak |
| 2013/0336629 | A1 | 12/2013 | Mulholland et al. |
| 2018/0189568 | A1 | 7/2018 | Powderly et al. |
| 2018/0356884 | A1* | 12/2018 | Lee .......................... H04S 3/008 |
| 2022/0253098 | A1 | 8/2022 | Berliner et al. |
| 2023/0128520 | A1 | 4/2023 | Rho et al. |
| 2024/0127726 | A1 | 4/2024 | Morinaga et al. |

FOREIGN PATENT DOCUMENTS

| | | |
|---|---|---|
| KR | 20150023792 A | 3/2015 |
| KR | 20170004816 A | 1/2017 |
| KR | 20190002416 A | 1/2019 |
| KR | 20200117444 A | 10/2020 |
| KR | 20220003254 A | 1/2022 |
| KR | 20220105354 A | 7/2022 |
| KR | 102524641 B1 | 4/2023 |
| WO | 2023007927 A1 | 2/2023 |

OTHER PUBLICATIONS

Extended European Search Report dated Jan. 27, 2026 issued in European Patent Application No. 23907666.4.

* cited by examiner

300

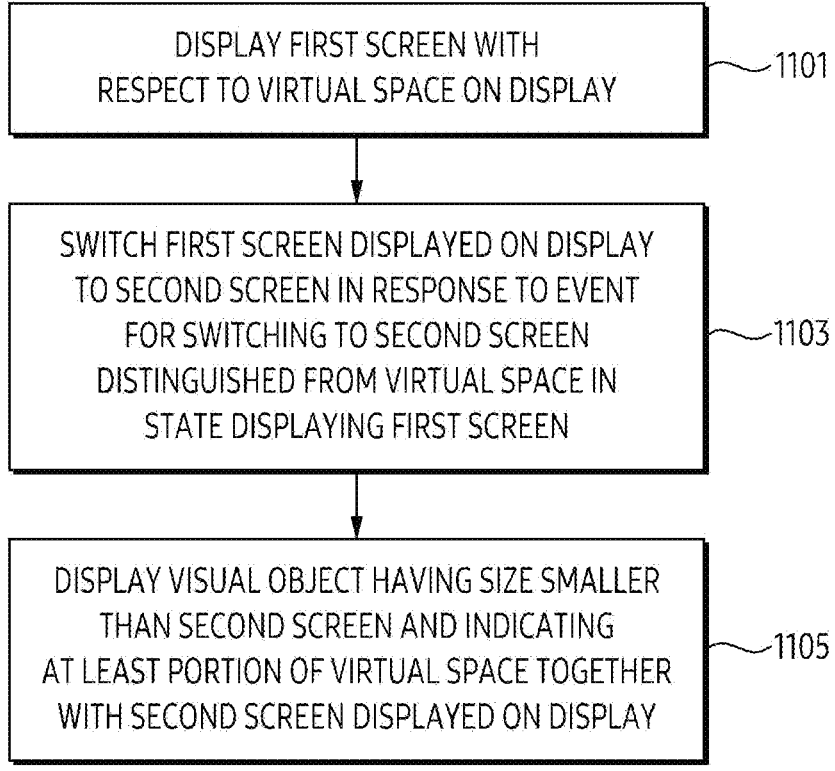

DISPLAY FIRST SCREEN WITH
RESPECT TO VIRTUAL SPACE ON DISPLAY ⌇1101

SWITCH FIRST SCREEN DISPLAYED ON DISPLAY
TO SECOND SCREEN IN RESPONSE TO EVENT
FOR SWITCHING TO SECOND SCREEN
DISTINGUISHED FROM VIRTUAL SPACE IN
STATE DISPLAYING FIRST SCREEN ⌇1103

DISPLAY VISUAL OBJECT HAVING SIZE SMALLER
THAN SECOND SCREEN AND INDICATING
AT LEAST PORTION OF VIRTUAL SPACE TOGETHER
WITH SECOND SCREEN DISPLAYED ON DISPLAY ⌇1105

FIG. 11

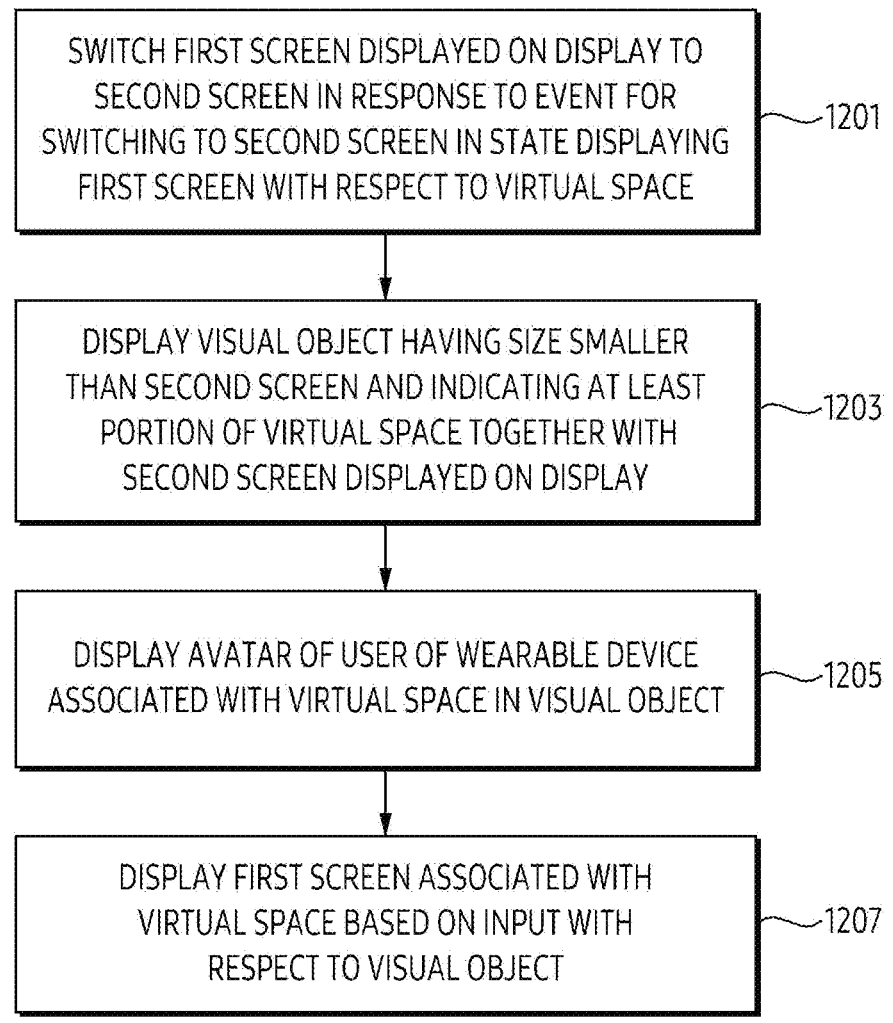

SWITCH FIRST SCREEN DISPLAYED ON DISPLAY TO SECOND SCREEN IN RESPONSE TO EVENT FOR SWITCHING TO SECOND SCREEN IN STATE DISPLAYING FIRST SCREEN WITH RESPECT TO VIRTUAL SPACE ~1201

DISPLAY VISUAL OBJECT HAVING SIZE SMALLER THAN SECOND SCREEN AND INDICATING AT LEAST PORTION OF VIRTUAL SPACE TOGETHER WITH SECOND SCREEN DISPLAYED ON DISPLAY ~1203

DISPLAY AVATAR OF USER OF WEARABLE DEVICE ASSOCIATED WITH VIRTUAL SPACE IN VISUAL OBJECT ~1205

DISPLAY FIRST SCREEN ASSOCIATED WITH VIRTUAL SPACE BASED ON INPUT WITH RESPECT TO VISUAL OBJECT ~1207

FIG. 12

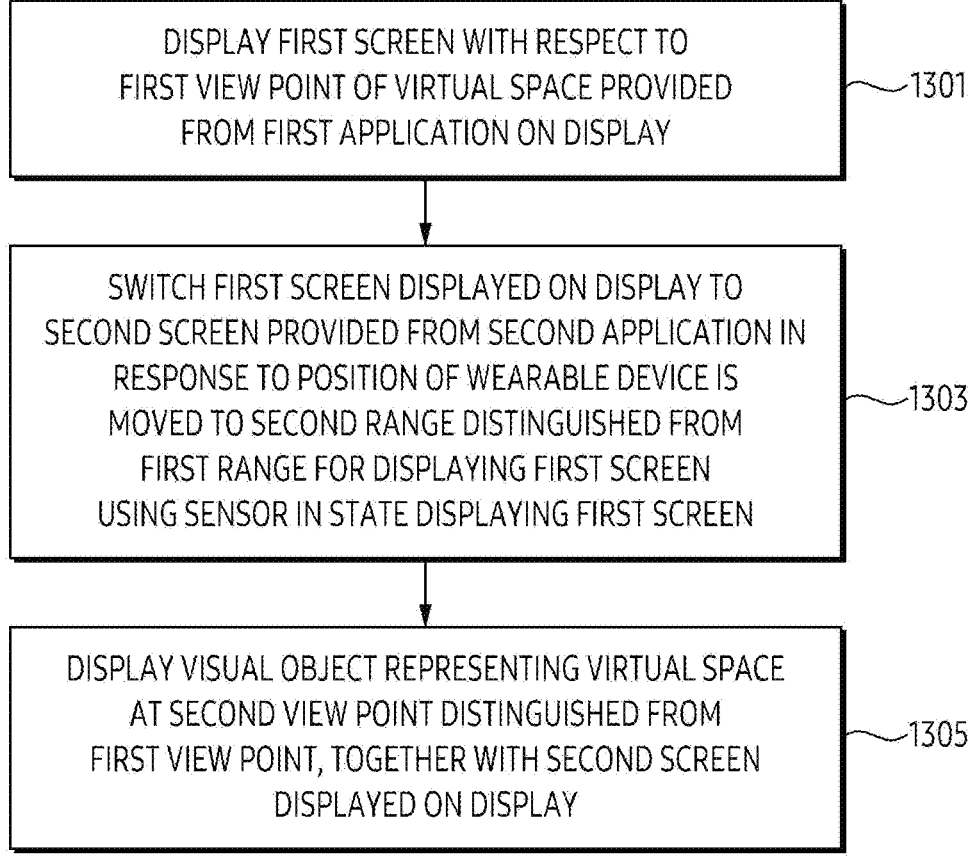

DISPLAY FIRST SCREEN WITH RESPECT TO
FIRST VIEW POINT OF VIRTUAL SPACE PROVIDED
FROM FIRST APPLICATION ON DISPLAY ~1301

SWITCH FIRST SCREEN DISPLAYED ON DISPLAY TO
SECOND SCREEN PROVIDED FROM SECOND APPLICATION IN
RESPONSE TO POSITION OF WEARABLE DEVICE IS
MOVED TO SECOND RANGE DISTINGUISHED FROM
FIRST RANGE FOR DISPLAYING FIRST SCREEN
USING SENSOR IN STATE DISPLAYING FIRST SCREEN ~1303

DISPLAY VISUAL OBJECT REPRESENTING VIRTUAL SPACE
AT SECOND VIEW POINT DISTINGUISHED FROM
FIRST VIEW POINT, TOGETHER WITH SECOND SCREEN
DISPLAYED ON DISPLAY ~1305

FIG. 13

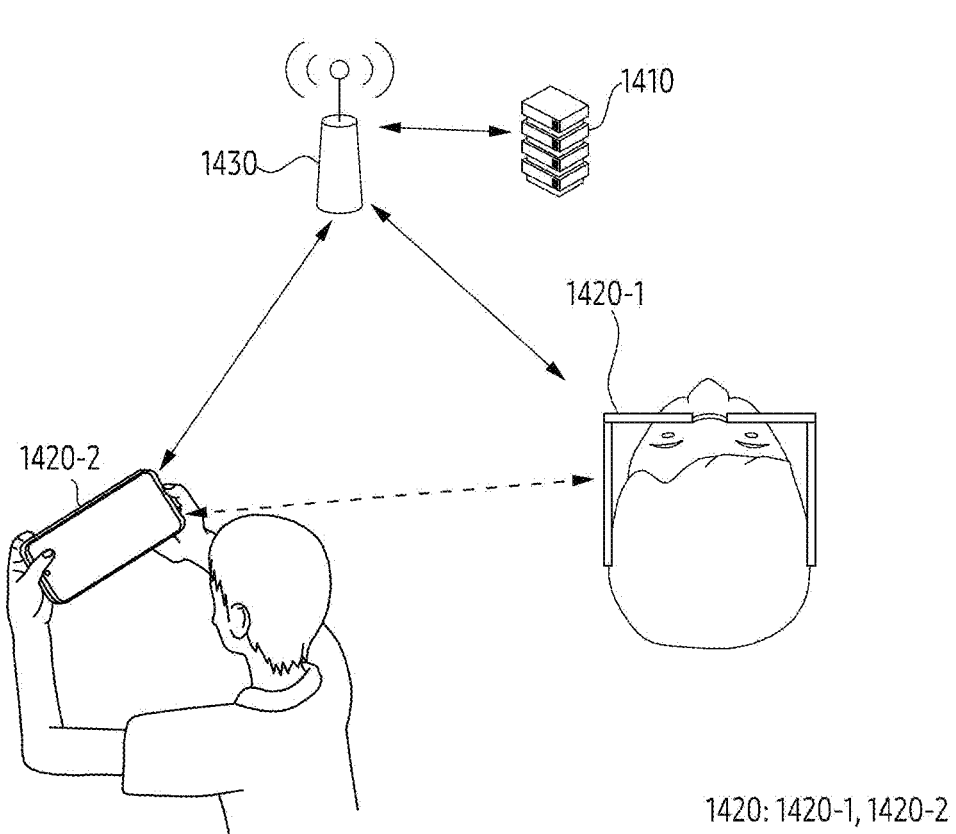
FIG. 14

1

WEARABLE DEVICE FOR DISPLAYING VISUAL OBJECT, AND METHOD THEREOF

CROSS-REFERENCE TO RELATED APPLICATIONS

This application is a continuation of International Application No. PCT/KR2023/020917 designating the United States, filed on Dec. 18, 2023, in the Korean Intellectual Property Receiving Office and claiming priority to Korean Patent Application Nos. 10-2022-0179368, filed on Dec. 20, 2022, and 10-2023-0002898, filed on Jan. 9, 2023, in the Korean Intellectual Property Office, the disclosures of each of which are incorporated by reference herein in their entireties.

BACKGROUND

Field

The disclosure relates to a wearable device for displaying a visual object and a method thereof.

Description of Related Art

In order to provide enhanced user experience, an electronic device providing an augmented reality (AR) service that displays information generated by a computer in conjunction with an external object in real-world is being developed. The electronic device may be a wearable device that may be worn by a user. For example, the electronic device may be AR glasses and/or a head-mounted device (HMD).

SUMMARY

According to an example embodiment, an electronic device may comprise: a display, a sensor, memory comprising one or more storage media storing instructions, and at least one processor, comprising processing circuitry. The instructions, when executed by at least on e processor individually and/or collectively, cause the electronic device to, while executing a first application to provide a virtual space, detect a direction of the electronic device using the sensor. The instructions, when executed by at least one processor individually and/or collectively, cause the electronic device to display, in an entire displaying area of the display, a first screen corresponding to a portion of the virtual space corresponding to the detected direction of the electronic device. The instructions, when executed by at least one processor individually and/or collectively, cause the electronic device to determine, using the sensor, whether a position of the electronic device is included in a first range to maintain providing a virtual reality service based on the virtual space. The instructions, when executed by at least one processor individually and/or collectively, cause the electronic device to based on detecting the position of the electronic device included in a second range different from the first range, display, in the entire displaying area of the display, a second screen provided from a second application. The instructions, when executed by at least one processor individually and/or collectively, cause the electronic device to display, on the second screen, a visual object associated with the virtual space having a size reduced based on a portion of the displaying area, on the second screen.

According to an example embodiment, a method of operating a wearable device including a display and a sensor may be provided. The method may comprise: while executing a first application to provide a virtual space, detecting a direction of the electronic device using the sensor; displaying, in an entire displaying area of the display, a first screen corresponding to a portion of the virtual space corresponding to the detected direction of the electronic device; determining, using the sensor, whether a position of the electronic device is included in a first range to maintain providing a virtual reality service based on the virtual space; based on detecting the position of the electronic device included in a second range different from the first range, displaying, in the entire displaying area of the display, a second screen provided from a second application; and displaying, on the second screen, a visual object associated with the virtual space having a size reduced based on a portion of the displaying area, on the second screen.

According to an example embodiment, a non-transitory computer-readable storage medium storing one or more programs may be provided. The one or more programs, when executed by at least one processor, comprising circuitry, individually and/or collectively, of an electronic device including a display and a sensor, may cause the electronic device to: while executing a first application to provide a virtual space, detect a direction of the electronic device using the sensor; display, in an entire displaying area of the display, a first screen corresponding to a portion of the virtual space corresponding to the detected direction of the electronic device; determine, using the sensor, whether a position of the electronic device is included in a first range to maintain providing a virtual reality service based on the virtual space; based on detecting the position of the electronic device included in a second range different from the first range, display, in the entire displaying area of the display, a second screen provided from a second application; and display, on the second screen, a visual object associated with the virtual space having a size reduced based on a portion of the displaying area, on the second screen.

According to an example embodiment, an electronic device may comprise: a display, a sensor, memory storing instructions, and at least one processor, comprising processing circuitry, wherein at least one processor, individually and/or collectively, may be configured to execute the instructions and to cause the electronic device to: display, on the display, a first screen with respect to a first view point of a virtual space provided from a first application, wherein the first screen may be displayed while a position of the electronic device identified by the sensor is included in a first range; in a state displaying the first screen, switch the first screen displayed on the display to a second screen provided from the second application, in response to identifying that the position of the electronic device is moved to a second range distinguished from the first range for displaying the first screen using the sensor; and together with the second screen displayed on the display, display a visual object representing the virtual space at a second view point distinguished from the first view point.

According to an example embodiment, a method of operating an electronic device may comprise: displaying, on a display, a first screen with respect to a first view point of a virtual space provided from a first application, wherein the first screen may be displayed while a position of the electronic device identified by a sensor is included in a first range; in a state displaying the first screen, switching the first screen displayed on the display to a second screen provided from a second application, in response to identifying that the position of the electronic device is moved to a second range distinguished from the first range for displaying the first screen using the sensor; and together with the second screen displayed on the display, displaying a visual object representing the virtual space at a second view point distinguished from the first view point.

According to an example embodiment, in a non-transitory computer-readable storage medium storing one or more programs, the one or more programs, when executed by at least one processor, comprising processing circuitry, individually and/or collectively, of a wearable device, may cause the wearable device to: display, on a display, a first screen with respect to a virtual space; in response to an event for switching to a second screen distinguished from the virtual space, in a state displaying the first screen, switch the first screen displayed on the display to the second screen; and together with the second screen displayed on the display, to display a visual object having a size smaller than the second screen and indicating at least a portion of the virtual space.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 11 is a flowchart illustrating an example operation of a wearable device according to various embodiments;

FIG. 12 is a flowchart illustrating an example operation of a wearable device according to various embodiments;

FIG. 13 is a flowchart illustrating an example operation of a wearable device according to various embodiments; and FIG. 14 is a diagram illustrating an example network environment associated with a metaverse service according to various embodiments.

DETAILED DESCRIPTION

Figure 1:
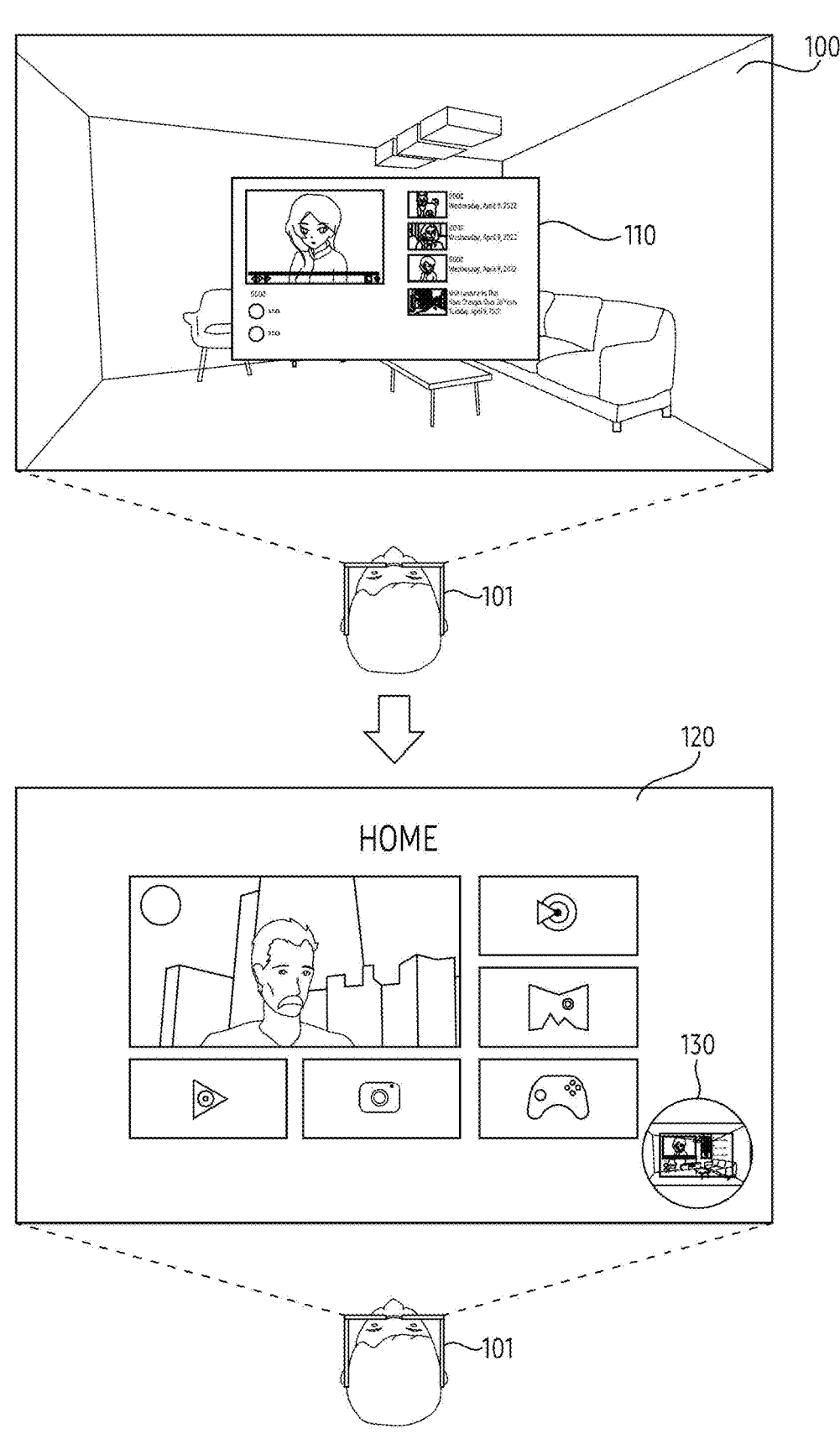
FIG. 1 is a diagram illustrating an example of a screen of a wearable device according to various embodiments.

Hereinafter, various example embodiments of the present disclosure will be described in greater detail with reference to the accompanying drawings.

The various example embodiments of the present disclosure and terms used herein are not intended to limit the technology described in the present disclosure to specific embodiments, and should be understood to include various modifications, equivalents, or substitutes of the corresponding embodiment. In relation to the description of the drawings, a reference numeral may be used for a similar component. A singular expression may include a plural expression unless it is clearly meant differently in the context. In the present disclosure, an expression such as "A or B", "at least one of A and/or B", "A, B or C", or "at least one of A, B and/or C", and the like may include all possible combinations of items listed together. Expressions such as "1st", "2nd", "first" or "second", and the like may modify the corresponding components regardless of order or importance, is simply used to distinguish one component from another component, but does not limit the corresponding components. When a (e.g., first) component is referred to as "connected (functionally or communicatively)" or "accessed" to another (e.g., second) component, the component may be directly connected to the other component or may be connected through another component (e.g., a third component).

The term "module" used in the present disclosure may include a unit configured with hardware, software, or firmware, or any combination thereof, and may be used interchangeably with terms such as logic, logic block, component, or circuit, and the like. The module may be an integrally configured component or a minimum unit or part thereof that performs one or more functions. For example, a module may be configured with an application-specific integrated circuit (ASIC).

FIG. 1 is a diagram illustrating an example of a screen of a wearable device according to various embodiments. Referring to FIG. 1, a wearable device 101 according to an embodiment may include a head-mounted display (HMD) wearable on a head of a user. The wearable device 101 according to an embodiment may be referred to as an electronic device. For example, the electronic device may form the HMD by being coupled with an accessory to be attached to the head of the user. Although an external appearance of the wearable device 101 having a form of glasses is illustrated, the disclosure is not limited thereto. An example of a structure of the wearable device 101 wearable on the head of the user will be described with reference to FIGS. 3A and 3B and/or 4A and 4B. One or more hardware included in the wearable device 101 will be described by way of non-limiting example with reference to FIG. 2. Hereinafter, a software application may be referred to as an application.

According to an embodiment, the wearable device 101 may execute a function associated with augmented reality (AR) and/or mixed reality (MR). Referring to FIG. 1, in a state in which the user wears the wearable device 101, the wearable device 101 may include at least one lens positioned adjacent to an eye of the user. The wearable device 101 may couple ambient light passing through a lens with light emitted from a display of the wearable device 101. A displaying area of the display may be formed in the lens through which ambient light passes. Since the wearable device 101 couples the ambient light and the light emitted from the display, the user may see an image in which a real object recognized by the ambient light and a virtual object formed by the light emitted from the display are mixed.

According to an embodiment, the wearable device 101 may execute a function associated with video see-through (VST) and/or virtual reality (VR). Referring to FIG. 1, in a state in which the user wears the wearable device 101, the wearable device 101 may include a housing that covers the eye of the user. The wearable device 101 may include a display positioned on a first surface facing the eye in the state. The wearable device 101 may include a camera positioned on a second surface opposite to the first surface. Using the camera, the wearable device 101 may obtain frames including the ambient light. The wearable device 101 may cause the user to recognize the ambient light through the display, by outputting the frames in the display positioned on the first surface. A displaying area 100 of the display positioned on the first surface may be formed by one or more pixels included in the display. The wearable device 101 may cause the user to recognize a virtual object together with a real object recognized by the ambient light, by synthesizing the virtual object in the frames output through the display.

Referring to FIG. 1, according to an embodiment, the wearable device 101 may display a first screen 110 with respect to a virtual space on the display. For example, the virtual space may include a space generated based on execution of a first software application. For example, the virtual space may be displayed based on a 3-dimensional virtual coordinate system. For example, the first software application may include a software application for displaying media content. For example, the media content may include media content generated by a plurality of frames such as a video and a movie. For example, the first software application may include a software application for executing a game.

According to an embodiment, the wearable device 101 may identify an event for switching to a second screen 120 distinguished from the virtual space in a state displaying the first screen 110. For example, the event for switching to the second screen 120 may be generated based on an input with respect to a preset button for displaying a home screen. For example, the event for switching to the second screen 120 may be generated by an input for executing a second software application different from the first software application. For example, the event for switching to the second screen 120 may be generated based on a position of the wearable device 101 identified in a second range indicating outside a first range. For example, the event for switching to the second screen 120 may be generated based on at least temporary cessation of a software application associated with the first screen 110. The wearable device 101 may switch the first screen displayed on the display to the second screen 120 in response to identifying the event.

According to an embodiment, the wearable device 101 may display a visual object 130 in which the first screen 110 is reduced, together with the second screen 120. For example, the wearable device 101 may display the visual object 130 having a size smaller than the second screen 120 and indicating at least a portion of the virtual space, together with the second screen 120. For example, the visual object 130 may be represented in a 3-dimensional shape such as a sphere. For example, the visual object 130 may be in a form in which the virtual space is represented in the visual object 130 and transparency is adjusted to display the virtual space. For example, the transparency may be adjusted based on an alpha value.

The wearable device 101 according to an embodiment may display the visual object 130 together with the second screen 120. For example, the second screen 120 may include a screen such as the home screen and/or a home virtual space of the wearable device 101. For example, the second screen 120 may be a screen for displaying an image obtained based on the camera included in the wearable device 101. For example, the wearable device 101 may display the second screen 120 including the image output from the camera. The second screen 120 may be a screen including the home screen and/or the image output from the camera, but the disclosure is not limited thereto.

As described above, while displaying the first screen 110 with respect to the virtual space, the wearable device 101 according to an embodiment may switch the first screen 110 displayed on the display to the second screen 120 in response to the event for switching to the second screen 120 distinguished from the virtual space. The wearable device 101 may display the visual object 130 having the size smaller than the second screen 120 and indicating at least a portion of the virtual space together with the second screen 120 displayed on the display. The wearable device 101 may enhance user experience of the wearable device 101 by displaying the visual object 130 together with the second screen 120.

According to an embodiment, the wearable device 101 may identify an event for displaying the second screen 120 provided from the second software application while displaying the first screen 110 provided from the first software application. The wearable device 101 may switch from the first screen 110 to the second screen 120 in response to the event. When switching to the second screen 120, the wearable device 101 may identify a first state displaying the visual object 130 for representing at least a portion of the first screen 110. The wearable device 101 may at least temporarily cease the first software application associated with the visual object 130 in the first state. The wearable device 101 may terminate the first software application in a second state different from the first state. For example, the second state may be a state in which the visual object 130 is not displayed.

As described above, the wearable device 101 according to an embodiment may perform a different operation based on an identified state. For example, the wearable device 101 may control execution of the first software application associated with the visual object 130 based on whether the visual object 130 is displayed. The wearable device 101 may adjust a calculation and/or memory usage of a processor of the wearable device 101 by controlling the execution of the first software application based on whether the visual object 130 is displayed. The wearable device 101 may provide a pleasant virtual space service to the user by adjusting the calculation of and/or the memory usage of the processor.

Figure 2:
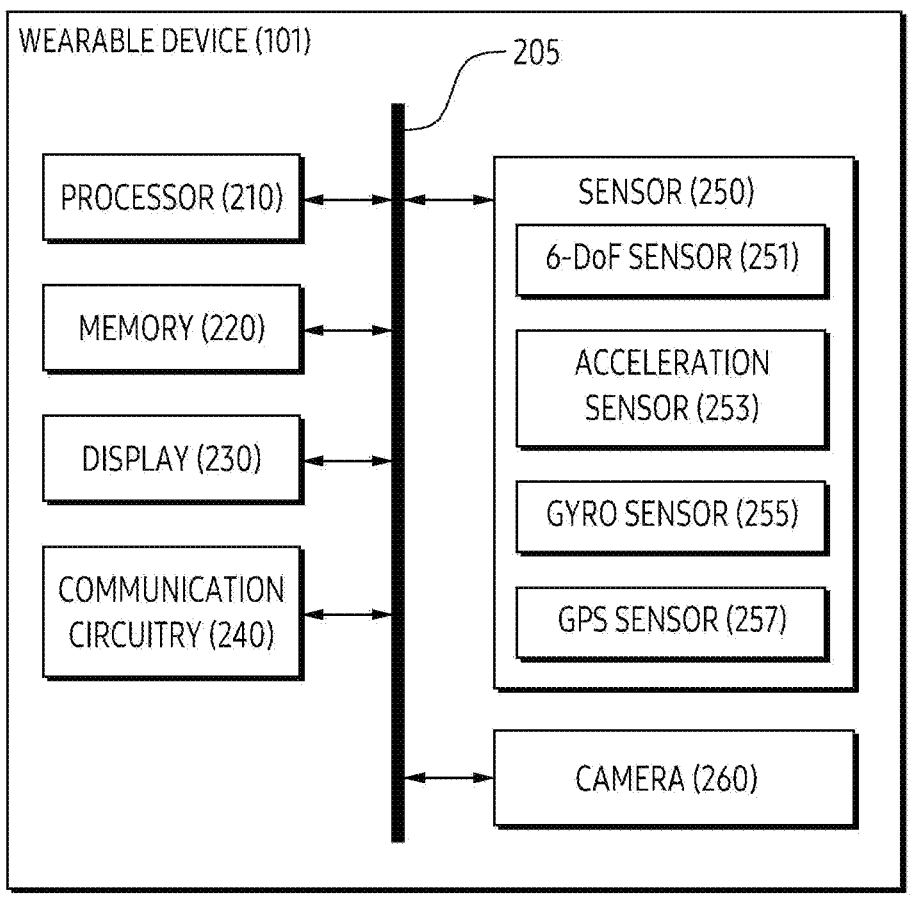
FIG. 2 is a block diagram illustrating an example configuration of a wearable device according to various embodiments.

FIG. 2 is a block diagram illustrating an example configuration of a wearable device according to various embodiments. A wearable device 101 of FIG. 2 may include the wearable device 101 of FIG. 1.

The wearable device 101 according to an embodiment may include at least one of a processor (e.g., including processing circuitry) 210, memory 220, a display 230, communication circuitry 240, a sensor 250, and/or a camera 260. The processor 210, the memory 220, the display 230, the communication circuitry 240, the sensor 250, and the camera 260 may be electronically and/or operably coupled with each other by an electronic component such as a communication bus 205. Hereinafter, hardware being operably coupled may refer, for example, to a direct connection, or an indirect connection between the hardware being established by wire and/or wirelessly so that second hardware is controlled by first hardware among the hardware. Although illustrated based on different blocks, the disclosure is not limited thereto, and a portion (e.g., at least a portion of the processor 210, the memory 220, and the communication circuitry 240) of the hardware of FIG. 2 may be included in a single integrated circuit such as a system on a chip (SoC). A type and/or the number of hardware included in the wearable device 101 is not limited as illustrated in FIG. 2. For example, the wearable device 101 may include only a portion of hardware components illustrated in FIG. 2.

The processor 210 of the wearable device 101 according to an embodiment may include hardware (e.g., processing circuitry) for processing data based on one or more instructions. The hardware for processing data may include, for example, an arithmetic and logic unit (ALU), a floating point unit (FPU), a field programmable gate array (FPGA), a central processing unit (CPU), and/or an application processor (AP). The processor 210 may have a structure of a single-core processor, or may have a structure of a multi-core processor such as a dual core, a quad core, or a hexa core. Hereinafter, operations of the wearable device 101 may be performed by the processor 210. Thus, the processor 210 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/ disclosed functions, e.g., in a distributed manner. At least one processor may execute program instructions to achieve or perform various functions.

According to an embodiment, the memory 220 of the wearable device 101 may include a hardware component for storing data and/or an instruction input and/or output to the processor 210 of the wearable device 101. The memory 220 may include, for example, volatile memory such as random-access memory (RAM) and/or non-volatile memory such as read-only memory (ROM). The volatile memory may include, for example, at least one of dynamic RAM (DRAM), static RAM (SRAM), Cache RAM, and pseudo SRAM (PSRAM). The non-volatile memory may include, for example, at least one of programmable ROM (PROM), erasable PROM (EPROM), electrically erasable PROM (EEPROM), flash memory, a hard disk, a compact disk, a solid state drive (SSD), and an embedded multi media card (eMMC).

According to an embodiment, the display 230 of the wearable device 101 may output visualized information (e.g., a visual object, and/or a screen, illustrated in FIGS. 1, 5, 6, 7, and/or 8) to a user. For example, the display 230 may output the visualized information to the user, by being controlled by the processor 210 including circuitry such as a graphic processing unit (GPU). The display 230 may include a flat panel display (FPD) and/or electronic paper. The FPD may include a liquid crystal display (LCD), a plasma display panel (PDP), and/or one or more light emitting diodes (LEDs). The LED may include an organic LED (OLED).

The communication circuitry 240 of the wearable device 101 according to an embodiment may include a hardware component for supporting transmission and/or reception of an electrical signal between the wearable device 101 and an external electronic device. The communication circuitry 240 may include, for example, at least one of a modem (MO- DEM), an antenna, and an optic/electronic (O/E) converter. The communication circuitry 240 may support transmission and/or reception of an electrical signal based on various types of protocols such as Ethernet, a local area network (LAN), a wide area network (WAN), wireless fidelity (WiFi), bluetooth low energy (BLE), ZigBee, long term evolution (LTE), and 5G new radio (NR).

According to an embodiment, the sensor 250 of the wearable device 101 may include various sensors and generate electronic information that may be processed by the processor 210 and/or the memory 220 of the wearable device 101 from non-electronic information associated with the wearable device 101. The information may be referred to as sensor data. The sensor 250 may include a global positioning system (GPS) sensor 257 for detecting a geographic location, an image sensor, an illumination sensor, and/or a time-of-flight (ToF) sensor, and an inertial measurement unit (IMU) for detecting a physical motion of the wearable device 101. For example, the sensor 250 for detecting the physical motion of the wearable device 101 may include a 6-degrees-of-freedom (DoF) sensor 251, an acceleration sensor 253, and/or a gyro sensor 255. According to an embodiment, the wearable device 101 may identify a position and/or movement of the wearable device 101 using at least one of the sensors 250 while displaying a first screen (e.g., the first screen 110 of FIG. 1) for representing a virtual space. The wearable device 101 may identify an event based on the position and/or the movement of the wearable device 101. For example, the event may include an event for switching to a second screen (e.g., the second screen 130 of FIG. 1). For example, the wearable device 101 may display a first screen in a first range. The wearable device 101 may identify movement to a second range indicating outside the first range. For example, the wearable device 101 may identify a change from a position of the wearable device 101 identified in the first range to a position of the wearable device 101 identified in the second range. The wearable device 101 may output an image obtained through the camera 260 based on being located in the second range. For example, while outputting the image obtained through the camera 260, the wearable device 101 may display a visual object (e.g., the visual object 130 of FIG. 1) that reduces the virtual space together with the image.

According to an embodiment, the camera 260 of the wearable device 101 may include one or more optical sensors (e.g., a charged coupled device (CCD) sensor and a complementary metal oxide semiconductor (CMOS) sensor) that generate an electrical signal indicating a color and/or brightness of light. A plurality of optical sensors included in the camera 260 may be positioned in a form of a 2-dimensional array. The camera 260 may generate 2-dimensional frame data corresponding to the light reaching the optical sensors of the 2-dimensional array by obtaining electrical signals of each of the plurality of optical sensors substantially simultaneously. For example, photo data captured using camera 260 may refer, for example, to a 2-dimensional frame data obtained from the camera 260. For example, video data captured using camera 260 may refer, for example, to a sequence of a plurality of 2-dimensional frame data obtained from the camera 260 according to a frame rate. The camera 260 may be positioned toward a direction in which the camera 260 receives the light, and may further include a flash light for outputting the light toward the direction. Although the camera 260 is illustrated based on a single block, the number of the cameras 260 included in the wearable device 101 is not limited.

Although not illustrated, the wearable device 101 according to an embodiment may include an output means for outputting information in a form other than a visualized form. For example, the wearable device 101 may include a speaker for outputting an acoustic signal. For example, the wearable device 101 may include a motor for providing haptic feedback based on vibration.

The wearable device 101 according to an embodiment may display the first screen with respect to the virtual space on the display 230. The wearable device 101 may identify the event for switching to the second screen distinguished from the virtual space in a state displaying the first screen. The wearable device 101 may switch the first screen displayed on the display 230 to the second screen in response to the event. The wearable device 101 may display a visual object having a size smaller than the second screen and indicating at least a portion of the virtual space together with the second screen displayed on the display 230. For example, the wearable device 101 may display the visual object based on a 3-dimensional shape such as a sphere. For example, the wearable device 101 may display the second screen for representing a preset virtual space, such as a home screen or a home virtual space.

The wearable device 101 according to an embodiment may display the visual object representing at least a portion of the virtual space together with the second screen. The wearable device 101 may identify an input for adjusting a size of the visual object. For example, the wearable device 101 may identify the input for adjusting the size of the visual object using an external electronic device (e.g., a controller). For example, the wearable device 101 may identify the input based on identifying a gesture of the user using the camera 260. The wearable device 101 may identify an input for expanding the size of the visual object. For example, the input for expanding the size of the visual object may include a gesture of dragging a periphery of the visual object in a first direction. For example, the input for expanding the size of the visual object may include a gesture such as pinch-to-zoom with respect to the visual object. For example, the wearable device 101 may identify an input for reducing the size of the visual object. For example, the input for reducing the size of the visual object may include a gesture of dragging the periphery of the visual object in a second direction opposite to the first direction. The input for adjusting the size of the visual object is not limited to what has been described above.

The wearable device 101 according to an embodiment may display an avatar corresponding to the user of the wearable device 101 in the visual object representing the virtual space. For example, the avatar may include a character controlled by the user in the virtual space. For example, the wearable device 101 may display the first screen with respect to the virtual space in a first-person view point. For example, the wearable device 101 may change the first screen displayed in the first-person view point to a third-person view point in order to display the avatar. The wearable device 101 may display a visual object for representing the first screen changed to the third-person view point, together with the second screen different from the first screen.

As described above, the wearable device 101 according to an embodiment may display the first screen with respect to the virtual space. While displaying the first screen, the wearable device 101 may identify the event for switching to the second screen different from the virtual space. The wearable device 101 may switch the first screen displayed on the display 230 to the second screen in response to the event. The wearable device 101 may display the visual object having the size smaller than the second screen and indicating at least a portion of the virtual space together with the second screen. The wearable device 101 may enhance user experience of the wearable device 101 by displaying the visual object indicating at least a portion of the virtual space together with the second screen.

Figure 3A:
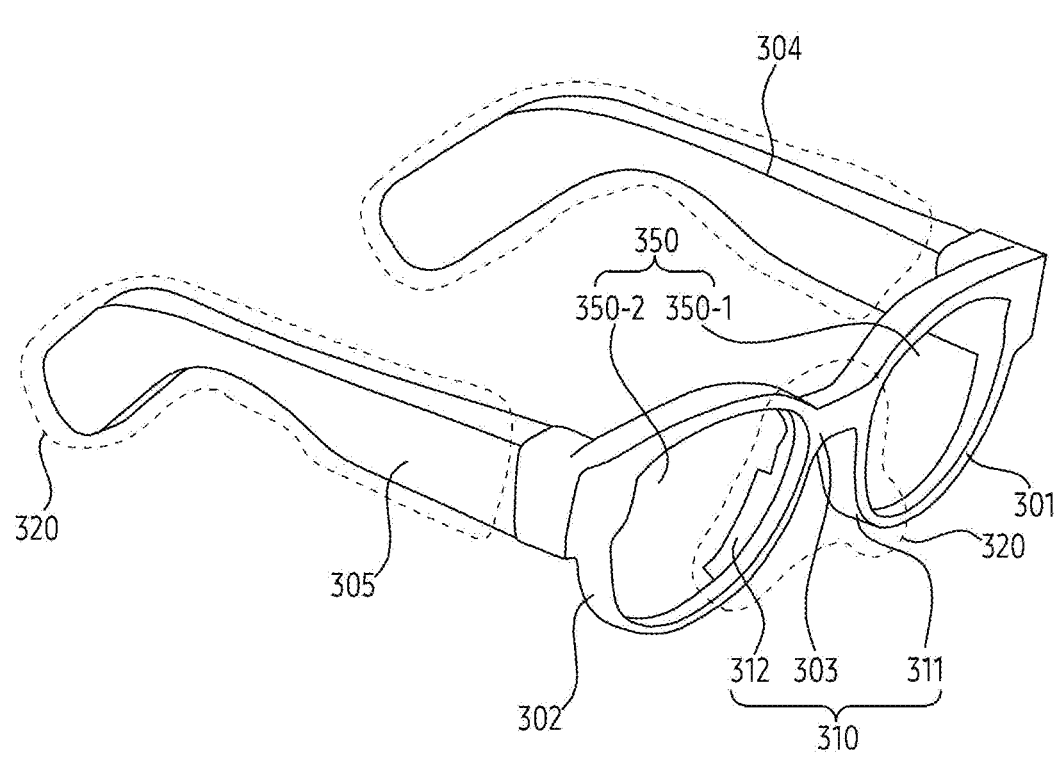
FIG. 3A is a perspective view illustrating an example wearable device according to various embodiments.
Figure 3B:
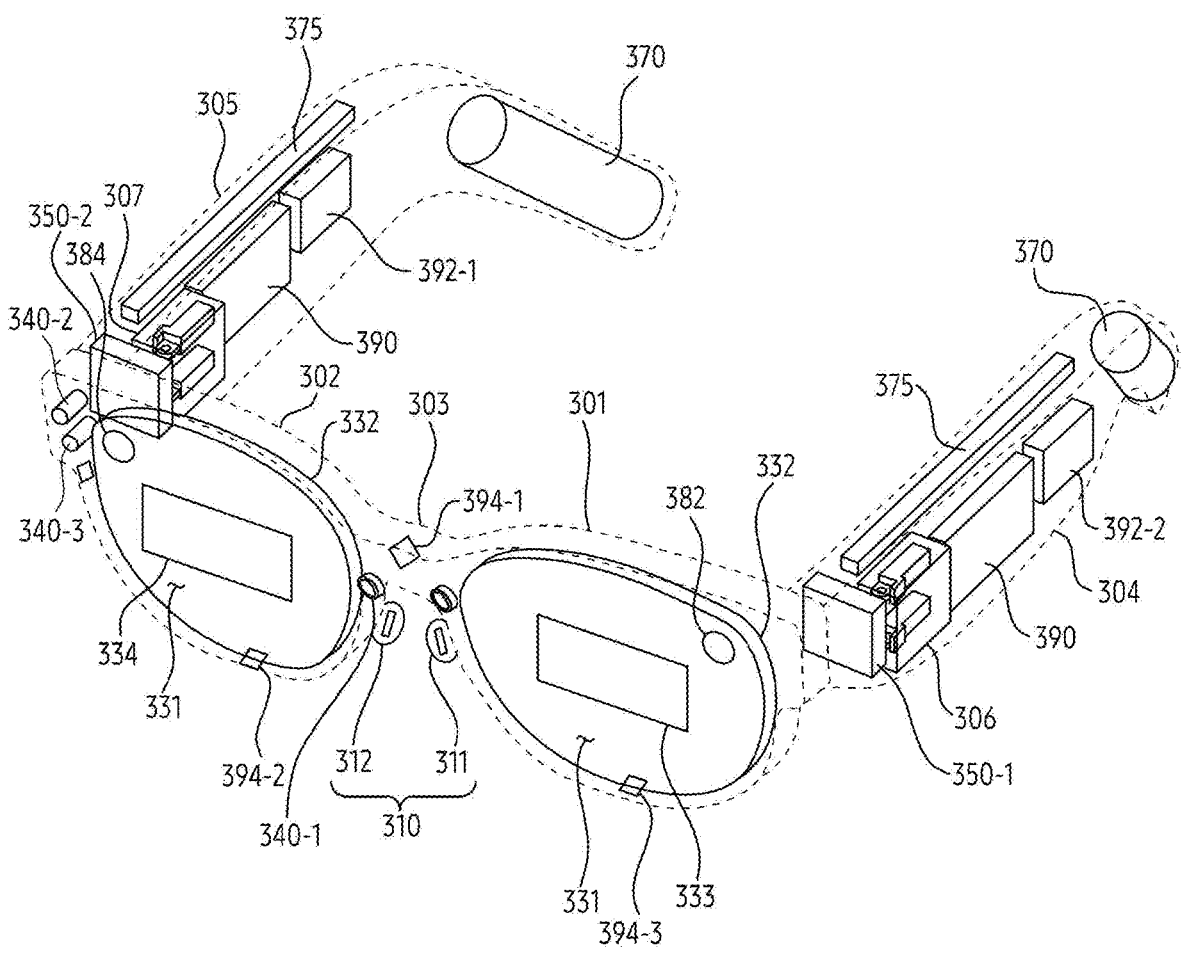
FIG. 3B is a perspective view illustrating an example configuration including one or more hardware positioned in a wearable device according to various embodiments.

FIG. 3A is a perspective view illustrating an example wearable device according to various embodiments. FIG. 3B is a perspective view illustrating an example configuration, including one or more hardware disposed in a wearable device according to various embodiments. A wearable device 300 of FIGS. 3A and 3B may include the wearable device 101 of FIGS. 1 and/or 2. As shown in FIG. 3A, according to an embodiment, the wearable device 300 may include at least one display 350 and a frame supporting the at least one display 350.

According to an embodiment, the wearable device 300 may be wearable on a portion of the user's body. The wearable device 300 may provide augmented reality (AR), virtual reality (VR), or mixed reality (MR) combining the augmented reality and the virtual reality to a user wearing the wearable device 300. For example, the wearable device 300 may output a virtual reality image through at least one display 350, in response to a user's preset gesture obtained through a motion recognition camera 340-2 of FIG. 3B.

According to an embodiment, the at least one display 350 in the wearable device 300 may provide visual information to a user. The at least one display 350 may include the display 230 of FIG. 2. For example, the at least one display 350 may include a transparent or translucent lens. The at least one display 350 may include a first display 350-1 and/or a second display 350-2 spaced apart from the first display 350-1. For example, the first display 350-1 and the second display 350-2 may be disposed at positions corresponding to the user's left and right eyes, respectively.

Referring to FIG. 3B, the at least one display 350 may form a display area on the lens to provide a user wearing the wearable device 300 with visual information included in ambient light passing through the lens and other visual information distinct from the visual information. The lens may be formed based on at least one of a fresnel lens, a pancake lens, or a multi-channel lens. The display area formed by the at least one display 350 may be formed on the second surface 332 of the first surface 331 and the second surface 332 of the lens. When the user wears the wearable device 300, ambient light may be transmitted to the user by being incident on the first surface 331 and being penetrated through the second surface 332. For another example, the at least one display 350 may display a virtual reality image to be coupled with a reality screen transmitted through ambient light. The virtual reality image output from the at least one display 350 may be transmitted to eyes of the user, through one or more hardware (e.g., optical devices 382 and 384, and/or at least one waveguides 333 and 334) included in the wearable device 300.

According to an embodiment, the wearable device 300 may include waveguides 333 and 334 that transmit light transmitted from the at least one display 350 and relayed by the at least one optical device 382 and 384 by diffracting to the user. The waveguides 333 and 334 may be formed based on at least one of glass, plastic, or polymer. A nano pattern may be formed on at least a portion of the outside or inside of the waveguides 333 and 334. The nano pattern may be formed based on a grating structure having a polygonal or curved shape. Light incident to an end of the waveguides 333 and 334 may be propagated to another end of the waveguides 333 and 334 by the nano pattern. The wave-
guides 333 and 334 may include at least one of at least one
diffraction element (e.g., a diffractive optical element
(DOE), a holographic optical element (HOE)), and a reflec-
tion element (e.g., a reflection mirror). For example, the
waveguides 333 and 334 may be disposed in the wearable
device 300 to guide a screen displayed by the at least one
display 350 to the user's eyes. For example, the screen may
be transmitted to the user's eyes through total internal
reflection (TIR) generated in the waveguides 333 and 334.

According to an embodiment, the wearable device 300
may analyze an object included in a real image collected
through a photographing camera 340-1, combine with a
virtual object corresponding to an object that become a
subject of augmented reality provision among the analyzed
object, and display on the at least one display 350. The
virtual object may include at least one of text and images for
various information associated with the object included in
the real image. The wearable device 300 may analyze the
object based on a multi-camera such as a stereo camera. For
the object analysis, the wearable device 300 may execute
time-of-flight (ToF) and/or simultaneous localization and
mapping (SLAM) supported by the multi-camera. The user
wearing the wearable device 300 may watch an image
displayed on the at least one display 350.

According to an embodiment, a frame may be configured
with a physical structure in which the wearable device 300
may be worn on the user's body. According to an embodi-
ment, the frame may be configured so that when the user
wears the wearable device 300, the first display 350-1 and
the second display 350-2 may be positioned corresponding
to the user's left and right eyes. The frame may support the
at least one display 350. For example, the frame may support
the first display 350-1 and the second display 350-2 to be
positioned at positions corresponding to the user's left and
right eyes.

Referring to FIG. 3A, according to an embodiment, the
frame may include an area 320 at least partially in contact
with the portion of the user's body in case that the user wears
the wearable device 300. For example, the area 320 of the
frame in contact with the portion of the user's body may
include an area in contact with a portion of the user's nose,
a portion of the user's ear, and a portion of the side of the
user's face that the wearable device 300 contacts. According
to an embodiment, the frame may include a nose pad 310
that is contacted on the portion of the user's body. When the
wearable device 300 is worn by the user, the nose pad 310
may be contacted on the portion of the user's nose. The
frame may include a first temple 304 and a second temple
305, which are contacted on another portion of the user's
body that is distinct from the portion of the user's body.

According to an embodiment, the frame may include a
first rim 301 surrounding at least a portion of the first display
350-1, a second rim 302 surrounding at least a portion of the
second display 350-2, a bridge 303 disposed between the
first rim 301 and the second rim 302, a first pad 311 disposed
along a portion of the edge of the first rim 301 from one end
of the bridge 303, a second pad 312 disposed along a portion
of the edge of the second rim 302 from the other end of the
bridge 303, the first temple 304 extending from the first rim
301 and fixed to a portion of the wearer's ear, and the second
temple 305 extending from the second rim 302 and fixed to
a portion of the ear opposite to the ear. The first pad 311 and
the second pad 312 may be in contact with the portion of the
user's nose, and the first temple 304 and the second temple
305 may be in contact with a portion of the user's face and
the portion of the user's ear. The temples 304 and 305 may be rotatably connected to the rim through hinge units 306
and 307 of FIG. 3B. The first temple 304 may be rotatably
connected with respect to the first rim 301 through the first
hinge unit 306 disposed between the first rim 301 and the
first temple 304. The second temple 305 may be rotatably
connected with respect to the second rim 302 through the
second hinge unit 307 disposed between the second rim 302
and the second temple 305. According to an embodiment,
the wearable device 300 may identify an external object
(e.g., a user's fingertip) touching the frame and/or a gesture
performed by the external object using a touch sensor, a grip
sensor, and/or a proximity sensor formed on at least a
portion of the surface of the frame.

According to an embodiment, the wearable device 300
may include hardware (e.g., hardware described above
based on the block diagram of FIG. 2) that performs various
functions. For example, the hardware may include a battery
module 370, an antenna module 375, optical devices 382
and 384, speakers 392-1 and 392-2, microphones 394-1,
394-2, and 394-3, a depth sensor module (not illustrated),
and/or a printed circuit board 390. Various hardware may be
disposed in the frame.

According to an embodiment, the microphones 394-1,
394-2, and 394-3 of the wearable device 300 may obtain a
sound signal, by being disposed on at least a portion of the
frame. The first microphone 394-1 disposed on the nose pad
310, the second microphone 394-2 disposed on the second
rim 302, and the third microphone 394-3 disposed on the
first rim 301 are illustrated in FIG. 3B, but the number and
disposition of the microphone 394 are not limited to an
embodiment of FIG. 3B. In a case that the number of the
microphone 394 included in the wearable device 300 is two
or more, the wearable device 300 may identify a direction of
the sound signal using a plurality of microphones disposed
on different portions of the frame.

According to an embodiment, the optical devices 382 and
384 may transmit a virtual object transmitted from the at
least one display 350 to the wave guides 333 and 334. For
example, the optical devices 382 and 384 may be projectors.
The optical devices 382 and 384 may be disposed adjacent
to the at least one display 350 or may be included in the at
least one display 350 as a portion of the at least one display
350. The first optical device 382 may correspond to the first
display 350-1, and the second optical device 384 may
correspond to the second display 350-2. The first optical
device 382 may transmit light output from the first display
350-1 to the first waveguide 333, and the second optical
device 384 may transmit light output from the second
display 350-2 to the second waveguide 334.

In an embodiment, a camera 340 may include an eye
tracking camera (ET CAM) 340-1, a motion recognition
camera 340-2 and/or the photographing camera 340-3. The
photographing camera 340-3, the eye tracking camera **340-
1, and the motion recognition camera 340-2** may be disposed
at different positions on the frame and may perform different
functions. The photographing camera 340-3, the eye track-
ing camera 340-1, and the motion recognition camera 340-2
may be an example of the camera 225 of FIG. 2. The eye
tracking camera 340-1 may output data indicating a gaze of
the user wearing the wearable device 300. For example, the
wearable device 300 may detect the gaze from an image
including the user's pupil, obtained through the eye tracking
camera 340-1. An example in which the eye tracking camera
340-1 is disposed toward the user's right eye is illustrated in
FIG. 3B, but the disclosure is not limited thereto, and the eye
tracking camera 340-1 may be disposed alone toward the
user's left eye or may be disposed toward two eyes.

In an embodiment, the photographing camera 340-3 may photograph a real image or background to be matched with a virtual image in order to implement the augmented reality or mixed reality content. The photographing camera may photograph an image of a specific object existing at a position viewed by the user and may provide the image to the at least one display 350. The at least one display 350 may display one image in which a virtual image provided through the optical devices 382 and 384 is overlapped with information on the real image or background including the image of the specific object obtained using the photographing camera. In an embodiment, the photographing camera may be disposed on the bridge 303 disposed between the first rim 301 and the second rim 302.

In an embodiment, the eye tracking camera 340-1 may implement a more realistic augmented reality by matching the user's gaze with the visual information provided on the at least one display 350, by tracking the gaze of the user wearing the wearable device 300. For example, when the user looks at the front, the wearable device 300 may naturally display environment information associated with the user's front on the at least one display 350 at a position where the user is positioned. The eye tracking camera 340-1 may be configured to capture an image of the user's pupil in order to determine the user's gaze. For example, the eye tracking camera 340-1 may receive gaze detection light reflected from the user's pupil and may track the user's gaze based on the position and movement of the received gaze detection light. In an embodiment, the eye tracking camera 340-1 may be disposed at a position corresponding to the user's left and right eyes. For example, the eye tracking camera 340-1 may be disposed in the first rim 301 and/or the second rim 302 to face the direction in which the user wearing the wearable device 300 is positioned.

The motion recognition camera 340-2 may provide a specific event to the screen provided on the at least one display 350 by recognizing the movement of the whole or portion of the user's body, such as the user's torso, hand, or face. The motion recognition camera 340-2 may obtain a signal corresponding to motion by recognizing the user's gesture, and may provide a display corresponding to the signal to the at least one display 350. A processor may identify a signal corresponding to the operation and may perform a preset function based on the identification. In an embodiment, the motion recognition camera 340-2 may be disposed on the first rim 301 and/or the second rim 302.

According to an embodiment, the camera 340 included in the wearable device 300 is not limited to the above-described eye tracking camera 340-1 and the motion recognition camera 340-2. For example, the wearable device 300 may identify an external object included in the FoV using a photographing camera 340-3 disposed toward the user's FoV. The wearable device 300 identifying the external object may be performed based on a sensor for identifying a distance between the wearable device 300 and the external object, such as a depth sensor and/or a time of flight (ToF) sensor. The camera 340 disposed toward the FoV may support an autofocus function and/or an optical image stabilization (OIS) function. For example, in order to obtain an image including a face of the user wearing the wearable device 300, the wearable device 300 may include the camera 340 (e.g., a face tracking (FT) camera) disposed toward the face.

Although not illustrated, the wearable device 300 according to an embodiment may further include a light source (e.g., LED) that emits light toward a subject (e.g., user's eyes, face, and/or an external object in the FoV) photographed using the camera 340. The light source may include an LED having an infrared wavelength. The light source may be disposed on at least one of the frame, and the hinge units 306 and 307.

According to an embodiment, the battery module 370 may supply power to electronic components of the wearable device 300. In an embodiment, the battery module 370 may be disposed in the first temple 304 and/or the second temple 305. For example, the battery module 370 may be a plurality of battery modules 370. The plurality of battery modules 370, respectively, may be disposed on each of the first temple 304 and the second temple 305. In an embodiment, the battery module 370 may be disposed at an end of the first temple 304 and/or the second temple 305.

In an embodiment, the antenna module 375 may transmit the signal or power to the outside of the wearable device 300 or may receive the signal or power from the outside. The antenna module 375 may be electrically and/or operably connected to communication circuitry (e.g., the communication circuitry 235 of FIG. 2) in the wearable device 300. In an embodiment, the antenna module 375 may be disposed in the first temple 304 and/or the second temple 305. For example, the antenna module 375 may be disposed close to one surface of the first temple 304 and/or the second temple 305.

The speakers 392-1 and 392-2 may output a sound signal to the outside of the wearable device 300. A sound output module may be referred to as a speaker. In an embodiment, the speakers 392-1 and 392-2 may be disposed in the first temple 304 and/or the second temple 305 in order to be disposed adjacent to the ear of the user wearing the wearable device 300. For example, the wearable device 300 may include a second speaker 392-2 disposed adjacent to the user's left ear by being disposed in the first temple 304, and a first speaker 392-1 disposed adjacent to the user's right ear by being disposed in the second temple 305.

The light emitting module (not illustrated) may include at least one light emitting element. The light emitting module may emit light of a color corresponding to a specific state or may emit light through an operation corresponding to the specific state in order to visually provide information on a specific state of the wearable device 300 to the user. For example, when the wearable device 300 requires charging, it may emit repeatedly red light at a designated time. In an embodiment, the light emitting module may be disposed on the first rim 301 and/or the second rim 302.

Referring to FIG. 3B, according to an embodiment, the wearable device 300 may include the printed circuit board (PCB) 390. The PCB 390 may be included in at least one of the first temple 304 or the second temple 305. The PCB 390 may include an interposer disposed between at least two sub PCBs. On the PCB 390, one or more hardware (e.g., hardware illustrated by blocks described above with reference to FIG. 2) included in the wearable device 300 may be disposed. The wearable device 300 may include a flexible PCB (FPCB) for interconnecting the hardware.

According to an embodiment, the wearable device 300 may include at least one of a gyro sensor, a gravity sensor, and/or an acceleration sensor for detecting the posture of the wearable device 300 and/or the posture of a body part (e.g., a head) of the user wearing the wearable device 300. Each of the gravity sensor and the acceleration sensor may measure gravity acceleration, and/or acceleration based on preset 3-dimensional axes (e.g., x-axis, y-axis, and z-axis) perpendicular to each other. The gyro sensor may measure angular velocity of each of preset 3-dimensional axes (e.g., x-axis, y-axis, and z-axis). At least one of the gravity sensor, the acceleration sensor, and the gyro sensor may be referred to as an inertial measurement unit (IMU). According to an embodiment, the wearable device 300 may identify the user's motion and/or gesture performed to execute or stop a specific function of the wearable device 300 based on the IMU.

Figure 4A:
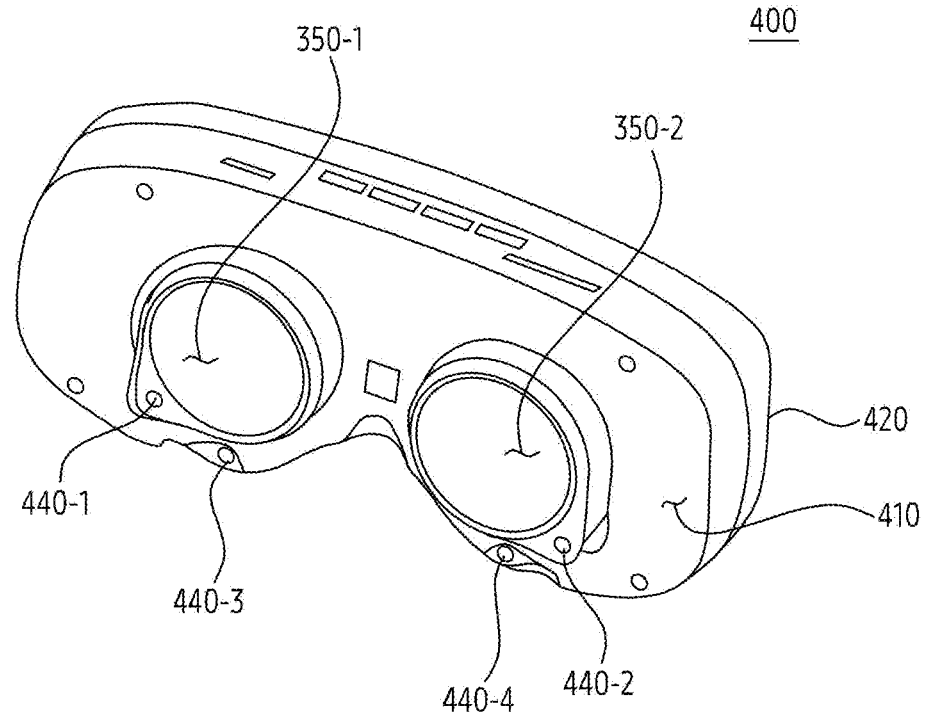
FIGS. 4A and 4B are perspective views illustrating an example of an exterior of a wearable device according to various embodiments.
Figure 4B:
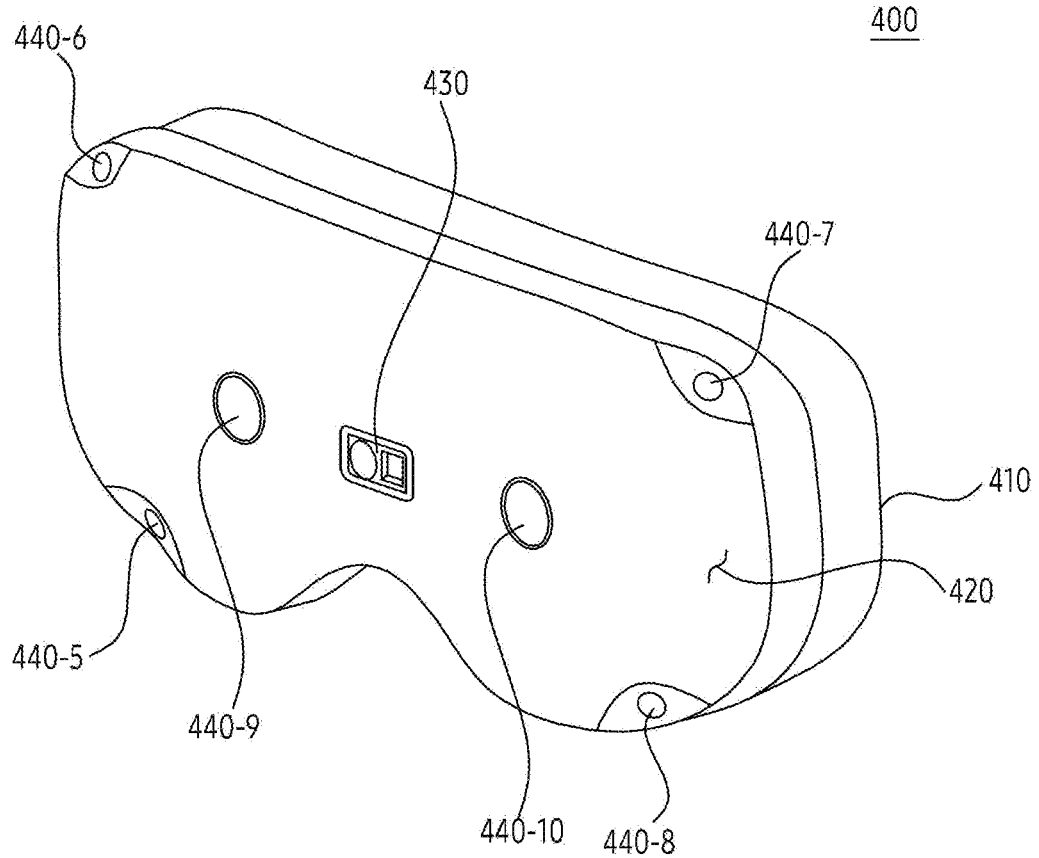

FIGS. 4A and 4B are perspective views illustrating an example of an exterior of a wearable device 400 according to various embodiments. The wearable device 400 of FIGS. 4A and 4B may include the wearable device 101 of FIGS. 1 and 2. According to an embodiment, an example of an exterior of a first surface 410 of a housing of the wearable device 400 is shown in FIG. 4A, and an example of an exterior of a second surface 420 opposite to the first surface 410 may be shown in FIG. 4B.

Referring to FIG. 4A, according to an embodiment, the first surface 410 of the wearable device 400 may have an attachable shape on the user's body part (e.g., the user's face). Although not illustrated, the wearable device 400 may further include a strap for being fixed on the user's body part, and/or one or more temples (e.g., the first temple 304 and/or the second temple 305 of FIGS. 3A to 3B). A first display 350-1 for outputting an image to the left eye among the user's two eyes and a second display 350-2 for outputting an image to the right eye among the user's two eyes may be disposed on the first surface 410. The wearable device 400 may further include rubber or silicon packing, which are formed on the first surface 410, for preventing and/or reducing interference by light (e.g., ambient light) different from the light emitted from the first display 350-1 and the second display 350-2.

According to an embodiment, the wearable device 400 may include cameras 440-1 and 440-2 for photographing and/or tracking two eyes of the user adjacent to each of the first display 350-1 and the second display 350-2. The cameras 440-1 and 440-2 may be referred to as the ET camera. According to an embodiment, the wearable device 400 may include cameras 440-3 and 440-4 for photographing and/or recognizing the user's face. The cameras 440-3 and 440-4 may be referred to as a FT camera.

Referring to FIG. 4B, a camera (e.g., cameras 440-5, 440-6, 440-8, 440-8, 440-9, and 440-10), and/or a sensor (e.g., the depth sensor 430) for obtaining information associated with the external environment of the wearable device 400 may be disposed on the second surface 420 opposite to the first surface 410 of FIG. 4A. For example, the cameras 440-5, 440-6, 440-7, 440-8, 440-9, and 440-10 may be disposed on the second surface 420 in order to recognize an external object distinct from the wearable device 400. For example, using cameras 440-9 and 440-10, the wearable device 400 may obtain an image and/or video to be transmitted to each of the user's two eyes. The camera 440-9 may be disposed on the second surface 420 of the wearable device 400 to obtain an image to be displayed through the second display 350-2 corresponding to the right eye among the two eyes. The camera 440-10 may be disposed on the second surface 420 of the wearable device 400 to obtain an image to be displayed through the first display 350-1 corresponding to the left eye among the two eyes.

According to an embodiment, the wearable device 400 may include the depth sensor 430 disposed on the second surface 420 in order to identify a distance between the wearable device 400 and the external object. Using the depth sensor 430, the wearable device 400 may obtain spatial information (e.g., a depth map) about at least a portion of the FoV of the user wearing the wearable device 400.

Although not illustrated, a microphone for obtaining sound output from the external object may be disposed on the second surface 420 of the wearable device 400. The number of microphones may be one or more according to embodiments.

Figure 5:
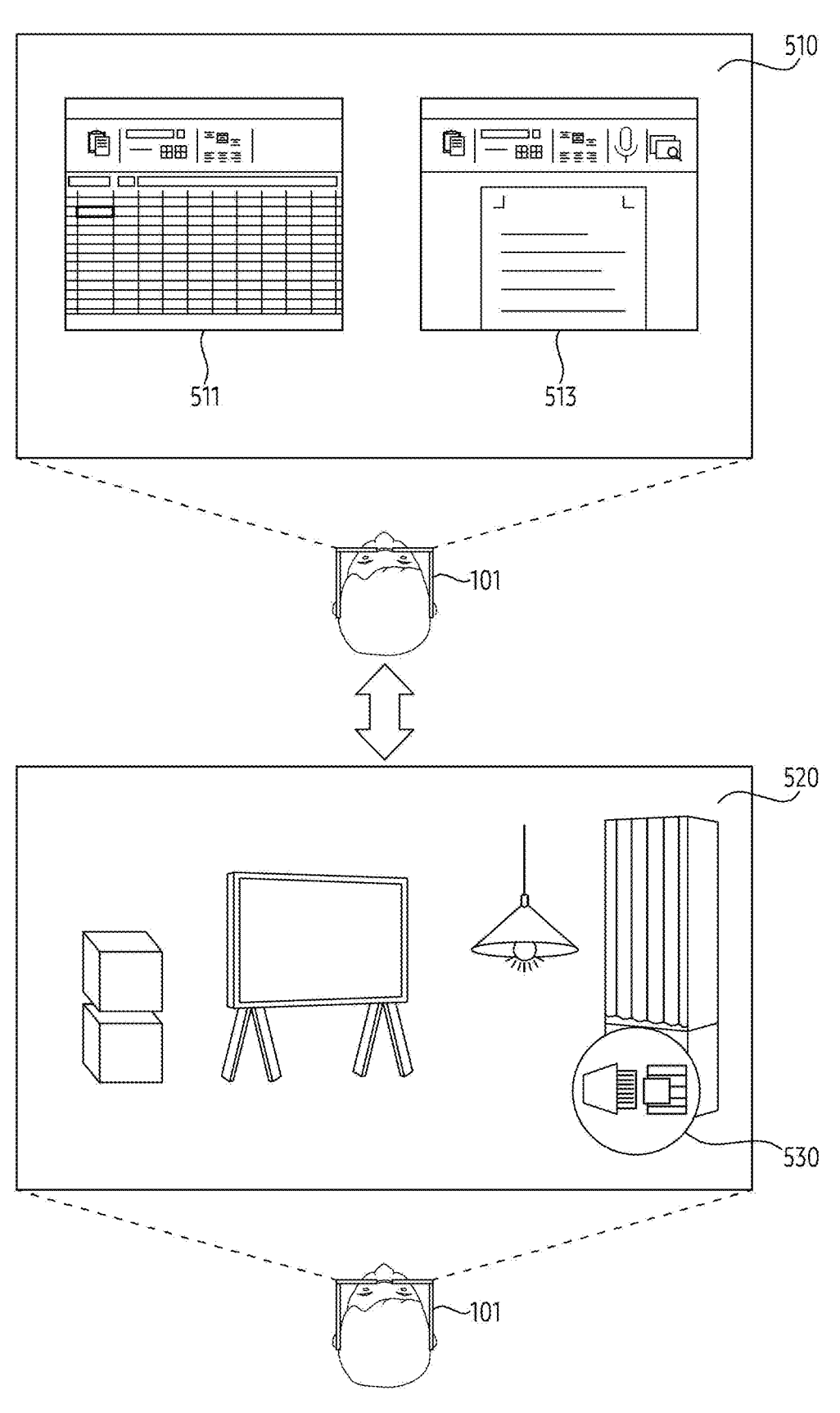
FIG. 5 is a diagram illustrating an example of a screen of a wearable device according to various embodiments.

FIG. 5 is a diagram illustrating an example of a screen of a wearable device according to various embodiments. A wearable device 101 of FIG. 5 may include the wearable device 101 of FIGS. 1 and/or 2. The wearable device 101 of FIG. 5 may include the wearable device 300 of FIGS. 3A and 3B. The wearable device 101 of FIG. 5 may include the wearable device 400 of FIGS. 4A and 4B. Operations of FIG. 5 may be performed by the processor 210 of FIG. 2.

Referring to FIG. 5, according to an embodiment, the wearable device 101 may display a first screen 510 on a display (e.g., the display 230 of FIG. 2). For example, the wearable device 101 may display a first virtual object 511 associated with a first software application based on execution of the first software application. The wearable device 101 may display a second virtual object 513 associated with a second software application based on execution of the second software application. For example, the wearable device 101 may display the first virtual object 511 and/or the second virtual object 513 on at least a portion of a virtual space.

According to an embodiment, the wearable device 101 may identify an event while displaying the first virtual object 511 and/or the second virtual object 513 in the first screen 510 associated with the virtual space. For example, the event may include identifying a position of the wearable device 101 in a second range indicating outside a first range. For example, the wearable device 101 may switch the first screen 510 to a second screen 520 in response to the event. For example, the second screen 520 may include an image obtained through a camera (e.g., the camera 260 of FIG. 2). For example, the second screen 520 may include a screen for representing a second virtual space different from a first virtual space with respect to the first screen 510, such as a home screen. For example, the second screen 520 may include a visual object 530 for representing the virtual objects 511 and 513 displayed in the first screen 510. The wearable device 101 may display the visual object 530 including an icon associated with a software application executed in the second virtual space, together with the second screen 520. The number of icons displayed in the visual object 530 is not limited.

The wearable device 101 according to an embodiment may identify an input with respect to the visual object 530. For example, the wearable device 101 may identify an input with respect to at least one of icons included in the visual object 530. The wearable device 101 may switch from the second screen 520 to the first screen 510 based on the input. For example, based on identifying the input with respect to at least one of the icons, the wearable device 101 may display a virtual object corresponding to the input icon. For example, the wearable device 101 may display the virtual objects 511 and 513 corresponding to the icons included in the visual object 530 based on identifying the input with respect to the visual object 530.

As described above, the wearable device 101 according to an embodiment may display the first screen 510 with respect to the virtual space. The wearable device 101 may identify the event for switching from the first screen 510 to the second screen 520. The wearable device 101 may switch the first screen 510 to the second screen 520 in response to the event. The wearable device 101 may display the visual object 530 including the icon representing the virtual objects 511 and 513 displayed in the virtual space, together with the second screen 520. The wearable device 101 may identify the input with respect to the visual object 530 while displaying the second screen 520. The wearable device 101 may display the first screen 510 based on the input with respect to the visual object 530. The wearable device 101 may display the virtual objects 511 and 513 associated with software applications corresponding to the icons included in the visual object 530 in the first screen 510. The wearable device 101 may enhance user experience of the wearable device 101 by switching from the first screen 510 to the second screen 520 in response to the event or switching from the second screen 520 to the first screen 510 based on the input with respect to the visual object 530.

Figure 6:
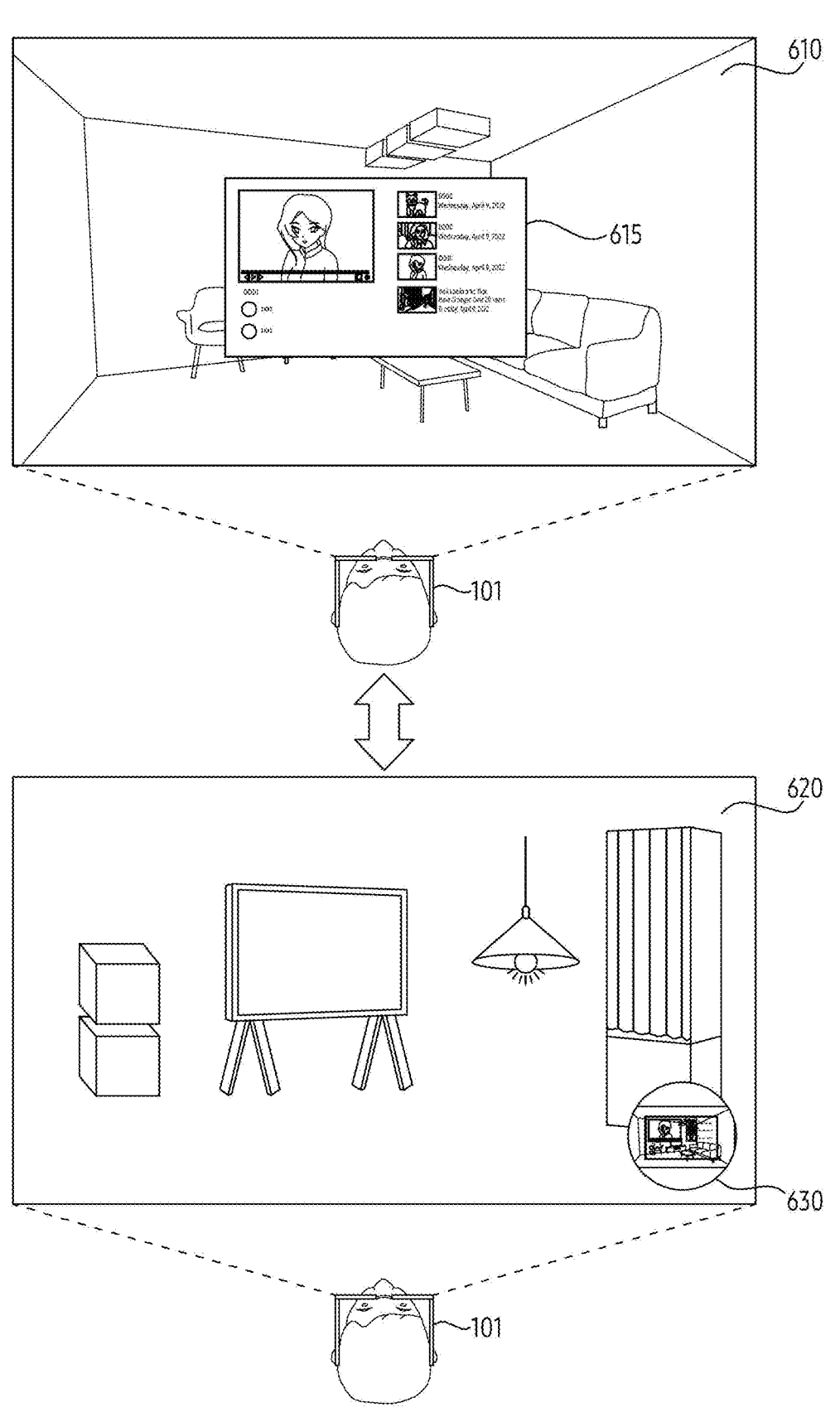
FIG. 6 is a diagram illustrating an example of a screen of a wearable device according to various embodiments.

FIG. 6 is a diagram illustrating an example of a screen of a wearable device according to various embodiments. A wearable device 101 of FIG. 6 may include the wearable device 101 of FIGS. 1, 2, and/or FIG. 5. The wearable device 101 of FIG. 6 may include the wearable device 300 of FIGS. 3A and 3B. The wearable device 101 of FIG. 6 may include the wearable device 400 of FIGS. 4A and 4B. Operations of FIG. 6 may be performed by the processor 210 of FIG. 2.

Referring to FIG. 6, according to an embodiment, the wearable device 101 may display a first screen 610 with respect to a virtual space. For example, the wearable device 101 may display a virtual object 615 associated with media content in the virtual space. The wearable device 101 may display the virtual object 615 in the first screen 610. The wearable device 101 may display an image 620 obtained through a camera in a state displaying the first screen 610. For example, an operation of displaying the image 620 obtained through the camera may be referred to as a VST mode. The wearable device 101 according to an embodiment may display a visual object 630 corresponding to the virtual space in at least a portion of a screen displaying the image 620 in a state displaying the image 620. For example, while displaying the first screen 610, the wearable device 101 may display the image 620 obtained through the camera based on identifying movement of a user. For example, the movement of the user may be identified based on scene recognition based on the image obtained through the camera. For example, the movement of the user may be identified based on a sensor for obtaining geographic information of the wearable device 101 such as a GPS sensor. For example, the movement of the user may be identified based on an indoor positioning system (IPS). For example, the movement of the user may be identified based on data obtained by a gyro sensor. For example, the movement of the user may be identified based on data obtained by an acceleration sensor. For example, the movement of the user may be identified based on data obtained by a geo-magnetic sensor. For example, the visual object 630 may be in a shape of a sphere. The wearable device 101 may display the visual object 630 in a relatively small size compared to a size of the screen displaying the image 620 obtained through the camera.

The wearable device 101 according to an embodiment may identify an input with respect to the visual object 630. For example, the input may be identified based on an external electronic device and/or a controller establishing a communication link with the wearable device 101 through communication circuitry. For example, the wearable device 101 may display the virtual space in the visual object 630 based on identifying the input. The wearable device 101 may display the virtual space using an entire area of a display. The wearable device 101 may change the screen 610 representing the virtual space and the image 620 obtained through the camera by an input of the user. The wearable device 101 may enhance user experience of the wearable device 101 by changing the screen 610 and the image 620.

As described above, the wearable device 101 according to an embodiment may display the screen 610 representing the virtual space and/or the image 620 obtained through the camera through the display. While displaying the image 620, the wearable device 101 may display the visual object 630 representing a portion of the virtual space. The wearable device 101 may display the visual object 630 and/or the image 620 together. The wearable device 101 may identify the input with respect to the visual object 630 while displaying the image 620. The wearable device 101 may switch to the screen 610 representing the virtual space based on the input with respect to the visual object 630. The wearable device 101 may enhance the user experience of the wearable device 101 by freely switching between the image 620 and the screen 610 by selection of the user.

Figure 7:
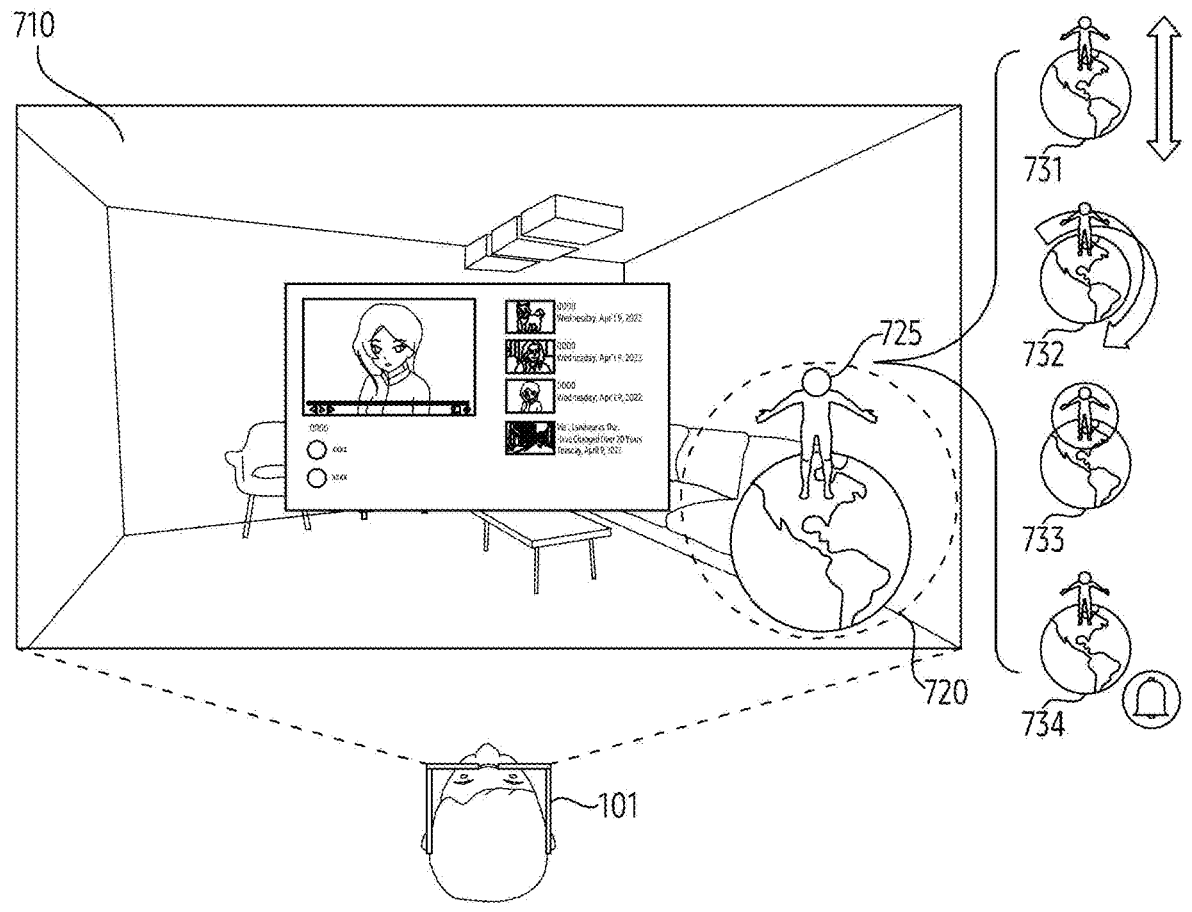
FIG. 7 is a diagram illustrating an example of a screen of a wearable device according to various embodiments.

FIG. 7 is a diagram illustrating an example of a screen of a wearable device according to various embodiments. A wearable device 101 of FIG. 7 may include the wearable device 101 of FIGS. 1, 2, 5, and/or 6. The wearable device 101 of FIG. 7 may include the wearable device 300 of FIGS. 3A and 3B and/or the wearable device 400 of FIGS. 4A and 4B. Operations of FIG. 7 may be performed by the processor 210 of FIG. 2.

Referring to FIG. 7, according to an embodiment, the wearable device 101 may display a screen 710 representing an image obtained through a first virtual space and/or a camera. While displaying the screen 710, the wearable device 101 may display a visual object 720 representing a second virtual space different from the first virtual space. The wearable device 101 may display an avatar 725 of the second virtual space in the visual object 720. The wearable device 101 may perform a display for notifying an event generated in the second virtual space using the avatar 725.

For example, the wearable device 101 may perform the display for notifying the event generated in the second virtual space, such as a first example 731 to a fourth example 734 illustrated in FIG. 7. For example, as in the first example 731, the wearable device 101 may move the visual object 720 up and down. For example, as in a second example 732, the wearable device 101 may rotate the visual object 720. A direction of the rotation is not limited. For example, as in a third example 733, the wearable device 101 may move the avatar 725 in the visual object 720. For example, as in the fourth example 734, the wearable device 101 may display a visual object indicating a notification in conjunction with the visual object 720. For example, the visual object indicating the notification may be referred to as an alarm clock shape and as an effect flashing the visual object 720.

As described above, the wearable device 101 according to an embodiment may display the visual object 720 associated with the second virtual space. For example, the wearable device 101 may display the visual object 720 in conjunction with the screen 710 displaying the image obtained through the first virtual space and/or the camera. The wearable device 101 may perform an operation for notifying the visual object 720 indicating the second virtual space of the event generated in the second virtual space. For example, the wearable device 101 may perform the same operation as the first example 731 to the fourth example 734. The wearable device 101 may notify a user of the event generated in the second virtual space by performing the operation. The wearable device 101 may intuitively notify the user of the event generated in the second virtual space by notifying the user of the event. The wearable device 101 may enhance user experience of the wearable device 101 by intuitively notifying the event.

Figure 8:
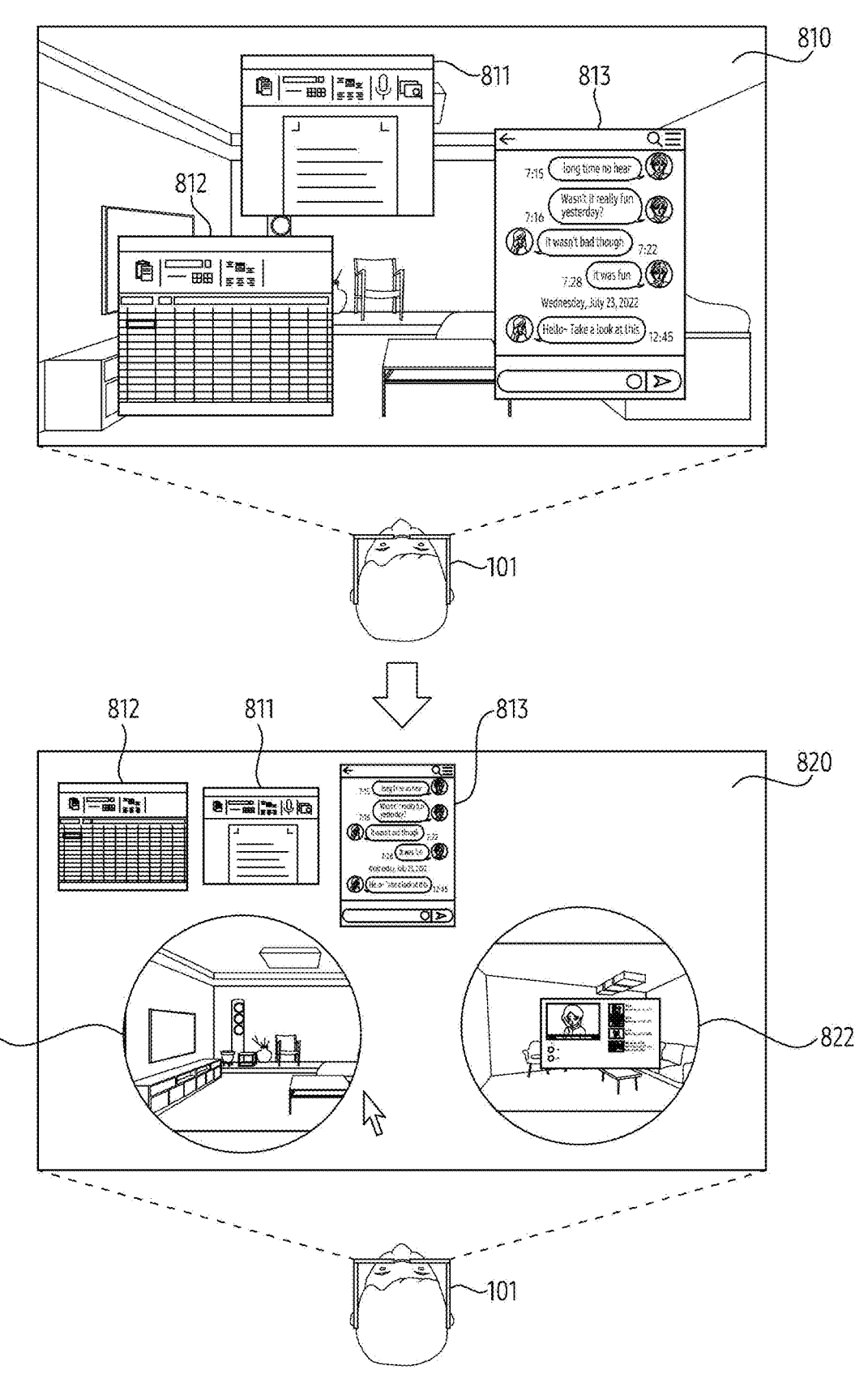
FIG. 8 is a diagram illustrating an example of a screen of a wearable device according to various embodiments.

FIG. 8 is a diagram illustrating an example of a screen of a wearable device according to various embodiments. A wearable device 101 of FIG. 8 may include the wearable device 101 of FIGS. 1, 2, 5, 6, and/or 7. The wearable device 101 of FIG. 8 may include the wearable device 300 of FIGS. 3A and 3B and/or the wearable device 400 of FIGS. 4A and 4B. Operations of FIG. 8 may be performed by the processor 210 of FIG. 2.

Referring to FIG. 8, according to an embodiment, the wearable device 101 may display a screen 810 representing a first virtual space. The wearable device 101 may display virtual objects 811, 812, and 813 associated with a second software application to a fourth software application different from a first software application for representing the first virtual space, together with the screen 810 representing the first virtual space. For example, the wearable device 101 may display the first virtual object 811, the second virtual object 812, and/or the third virtual object 813 in conjunction with the screen 810.

The wearable device 101 according to an embodiment may display a screen 820 associated with a second virtual space different from the first virtual space. For example, the screen 820 associated with the second virtual space may display a second visual object 822 for displaying a third virtual space different from the first virtual space and/or the second virtual space, together with the first visual object 821 representing the first virtual space. According to an embodiment, the wearable device 101 may identify an input with respect to one of the visual objects 821 and 822 while displaying the first visual object 821 and/or the second visual object 822. Referring to FIG. 8, the wearable device 101 may identify an input with respect to the first visual object 821. The wearable device 101 may display a software application executed in the first virtual space representing the first visual object 821 based on identifying the input with respect to the first visual object 821. For example, the wearable device 101 may display the first virtual object 811, the second virtual object 812, and/or the third virtual object 813 based on the input with respect to the first visual object 821. For example, the wearable device 101 may display the first virtual object 811 to the third virtual object 813 in a form such as a pop-up window.

As described above, according to an embodiment, the wearable device 101 may display the first visual object 821 representing the first virtual space. The wearable device 101 may identify the input with respect to the first visual object 821 while displaying the screen 820 representing the second virtual space different from the first virtual space. The wearable device 101 may display a virtual object associated with software applications executed in the first virtual space based on identifying the input with respect to the first visual object 821. For example, the wearable device 101 may display the first virtual object 811 to the third virtual object 813. The wearable device 101 may enhance user experience of the wearable device 101 by displaying the virtual object associated with the software application executed in the first virtual space in the second virtual space.

Figure 9:
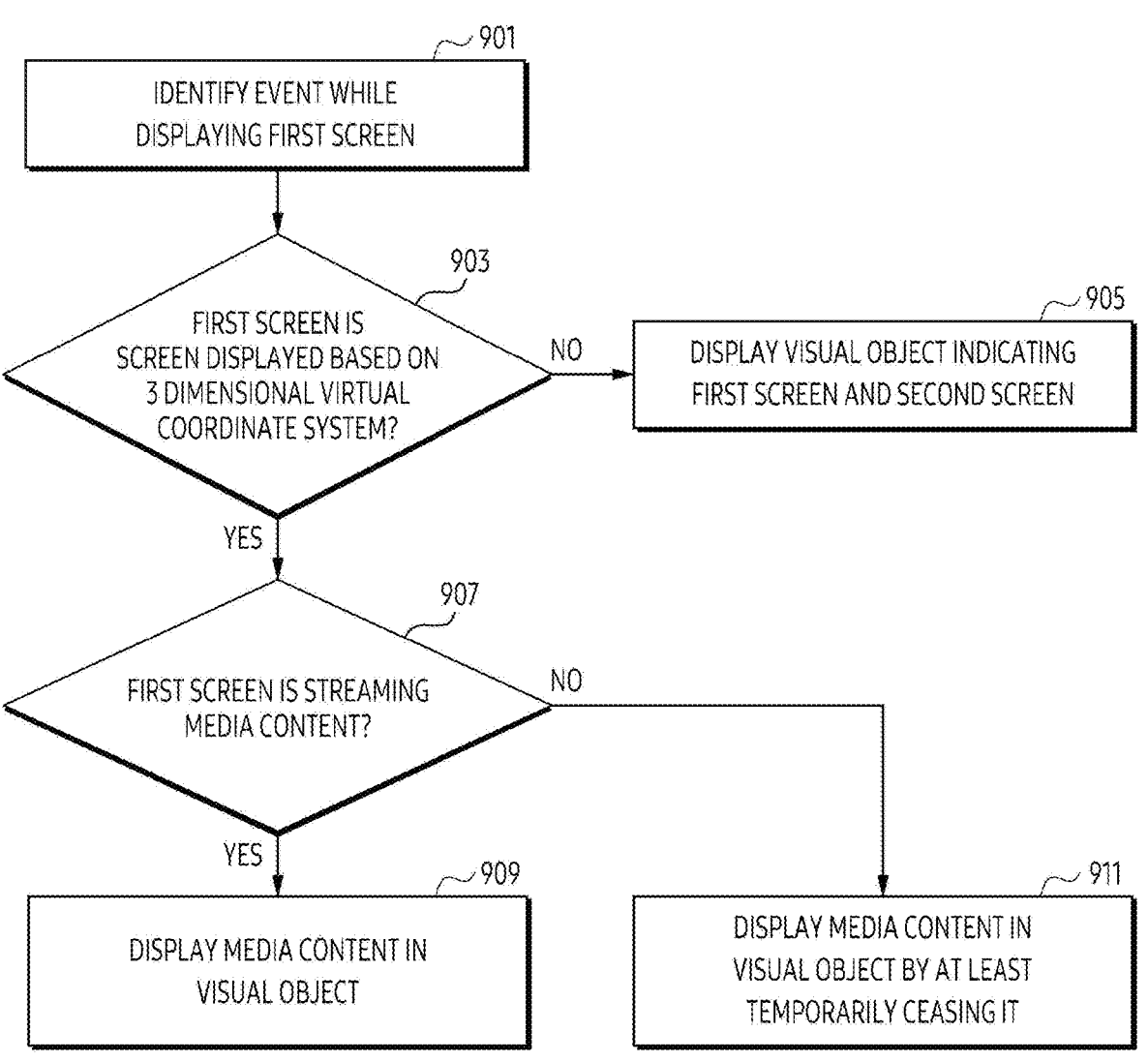
FIG. 9 is a flowchart illustrating an example operation of a wearable device according to various embodiments.

FIG. 9 is a flowchart illustrating an example operation of a wearable device according to various embodiments. The wearable device of FIG. 9 may include the wearable device 101 of FIGS. 1, 2, 5, 6, 7, and/or 8. The wearable device of FIG. 9 may include the wearable device 300 of FIGS. 3A and 3B and/or the wearable device 400 of FIGS. 4A and 4B. Operations of FIG. 9 may be performed by the processor 210 of FIG. 2.

Referring to FIG. 9, in an operation 901, the wearable device according to an embodiment may display a first screen (e.g., the first screen 110 of FIG. 1, the first screen 510 of FIG. 5, and/or the first screen 610 of FIG. 6) representing a virtual space. The wearable device may identify an event while displaying the first screen. For example, the event may be an event deviating from a range for displaying the first screen. For example, the event may be associated with an input for displaying a second screen (e.g., the second screen 120 of FIG. 1 and the second screen 520 of FIG. 5) different from the first screen. The wearable device may display the second screen different from the first screen based on identifying the event. For example, the second screen may be displayed based on execution of a different software application for displaying the first screen. For example, the second screen may be displayed based on an image (e.g., the image 620 of FIG. 6) obtained through a camera.

In an operation 903, the wearable device according to an embodiment may identify whether the first screen is a screen displayed based on a 3-dimensional virtual coordinate system. For example, the wearable device may identify whether the first screen is a screen associated with the virtual space.

In an operation 905, the wearable device according to an embodiment may display a visual object (e.g., the visual object 130 of FIG. 1, the visual object 530 of FIG. 5, and/or the visual object 630 of FIG. 6) indicating the first screen and the second screen based on identifying that the first screen is not displayed based on the 3-dimensional virtual coordinate system. For example, the second screen may be a screen for representing a second virtual space different from a first virtual space for displaying the first screen. The wearable device may display the visual object and the second screen in conjunction.

In an operation 907, the wearable device according to an embodiment may identify whether the first screen is streaming media content. For example, the wearable device may identify whether a software application associated with the first screen displays streamable multimedia content. The wearable device may display a different screen according to multimedia content displayed in the first screen.

In an operation 909, the wearable device according to an embodiment may display the media content associated with the first screen in the visual object. For example, the media content may include multimedia content. For example, the wearable device may display the visual object in conjunction with the second screen. The wearable device may stream the media content in the visual object.

In an operation 911, the wearable device according to an embodiment may display media content in the visual object by at least temporarily ceasing it. For example, the media content may include multimedia content. While displaying the visual object in conjunction with the second screen, the wearable device may display the media content displayed in the visual object by at least temporarily ceasing it.

As described above, the wearable device according to an embodiment may display the first screen and/or the second screen. While displaying the second screen, the wearable device may display the visual object associated with the virtual space displaying the first screen on at least a portion of the second screen. The wearable device may display the visual object in conjunction with the second screen. The wearable device may display the first virtual space in the visual object by displaying the second screen and the visual object. The wearable device may enhance user experience of the wearable device by displaying the visual object representing the first virtual space and the second screen.

Figure 10:
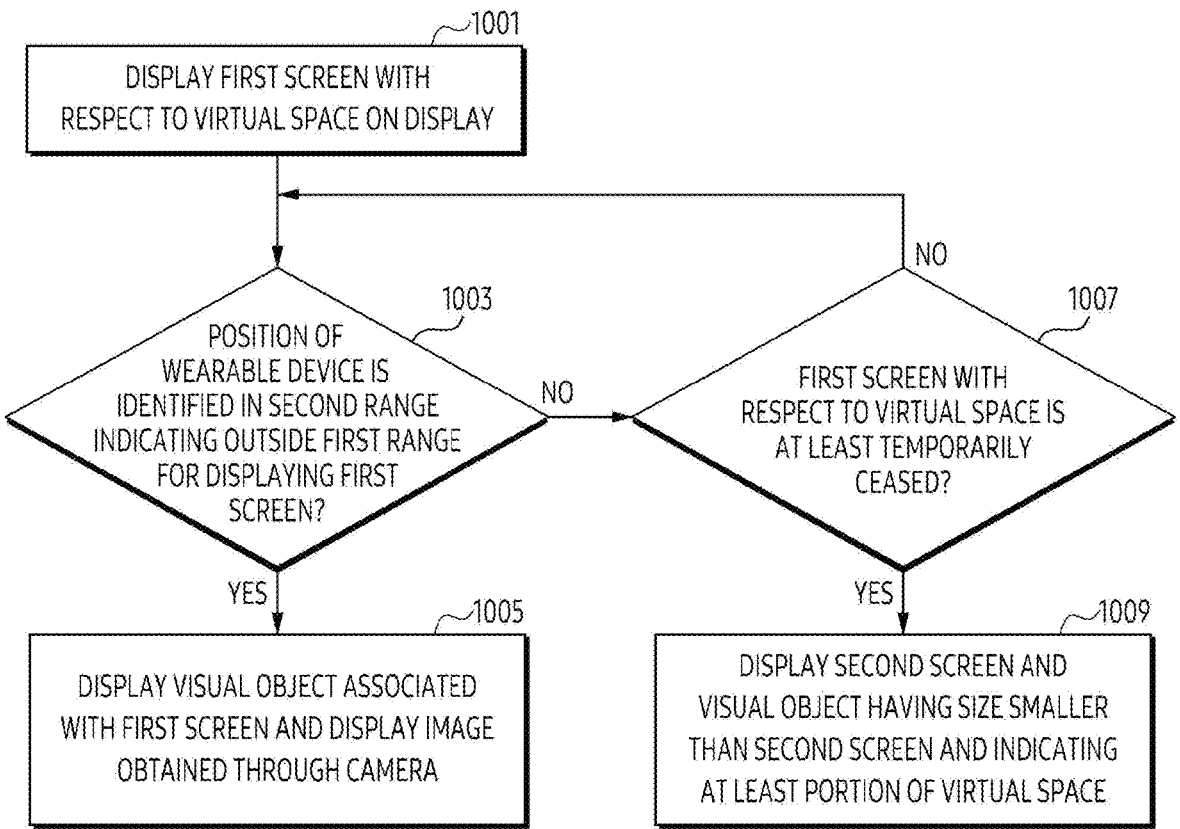
FIG. 10 is a flowchart illustrating an example operation of a wearable device according to various embodiments.

FIG. 10 is a flowchart illustrating an example operation of a wearable device according to various embodiments. The wearable device of FIG. 10 may include the wearable device 101 of FIGS. 1, 2, 5, 6, 7, and/or 8 and/or the wearable device of FIG. 9. The wearable device of FIG. 10 may include the wearable device 300 of FIGS. 3A and 3B and/or the wearable device 400 of FIGS. 4A and 4B. Operations of FIG. 10 may be performed by the processor 210 of FIG. 2.

Referring to FIG. 10, in an operation 1001, the wearable device according to an embodiment may display a first screen (e.g., the first screen 110 of FIG. 1, the first screen 510 of FIG. 5, and/or the first screen 610 of FIG. 6) with respect to a virtual space on a display. For example, the wearable device may display the first screen with respect to the virtual space based on execution of a software application.

In an operation 1003, according to an embodiment, the wearable device may identify a first range for displaying the first screen. For example, the wearable device may identify the first range for executing a first software application. The first range may be set by a user or stored in memory of the wearable device. The wearable device may identify a position of the wearable device in a second range indicating outside the first range. For example, the wearable device may identify whether the position of the wearable device is identified in the second range. The wearable device may identify the position of the wearable device using a GPS sensor and/or simultaneous localization and mapping (SLAM). An operation of identifying the position of the wearable device may include an operation of obtaining a coordinate detected by the GPS sensor. The position of the wearable device may be detected by controlling communication circuitry (e.g., the communication circuitry 240 of FIG. 2) while the wearable device is indoors. For example, the wearable device may receive or detect a signal (e.g., a positioning reference signal (PRS) of a new radio (NR) and/or a beacon signal) that may be used to detect a object adjacent to the wearable device and/or a position using ultra-wideband (UWB), Wi-Fi, and/or Bluetooth. The wearable device may calculate or determine the position of the wearable device (e.g., the position of the wearable device indoors). For example, the wearable device may identify the position of the wearable device based on a change in data obtained using an acceleration sensor, a gyro sensor, a geomagnetic sensor, and/or an image sensor. However, the disclosure is not limited thereto.

In an operation 1005, the wearable device according to an embodiment may identify the position of the wearable device in the second range indicating outside the first range. The wearable device may display a second screen (e.g., the second screen 120 of FIG. 1 and/or the second screen 520 of FIG. 5) different from the first screen indicating the virtual space based on identifying the position of the wearable device in the second range. For example, the second screen may include an image (e.g., the image 620 of FIG. 6) obtained through a camera. For example, the wearable device may display a visual object associated with the first screen in conjunction with the image. The wearable device may display the visual object (e.g., the visual object 130 of FIG. 1, the visual object 530 of FIG. 6, and/or the visual object 630 of FIG. 6) associated with the first screen, and display the image obtained through the camera.

In an operation 1007, the wearable device according to an embodiment may identify whether the first screen indicating the virtual space is at least temporarily ceased based on the position of the wearable device identified in the first range. The wearable device may identify whether multimedia content executed in a software application for displaying the first screen is at least temporarily ceased.

In an operation 1009, the wearable device according to an embodiment may display the second screen and a visual object having a size smaller than the second screen and indicating at least a portion of the virtual space. The visual object indicating at least a portion of the virtual space may be at least a portion of the first screen.

As described above, the wearable device according to an embodiment may perform a different operation based on event identification. For example, the event may be identification of the position of the wearable device in the second range indicating outside the first range. For example, the event may include at least temporary cessation of the first screen with respect to the virtual space. Based on the event, the wearable device may display the image through the camera, together with the visual object representing the virtual space, or a screen associated with a second software application different from the first software application associated with the virtual space. The wearable device may enhance user experience of the wearable device by displaying the plurality of virtual spaces in a screen.

FIG. 11 is a flowchart illustrating an example operation of a wearable device according to various embodiments. The wearable device of FIG. 11 may include the wearable device 101 of FIGS. 1, 2, 5, 6, 7, and 8 and/or the wearable device of FIGS. 9 and/or 10. The wearable device of FIG. 11 may include the wearable device 300 of FIGS. 3A and 3B and/or the wearable device 400 of FIGS. 4A and 4B. Operations of FIG. 11 may be performed by the processor 210 of FIG. 2.

Referring to FIG. 11, in an operation 1101, the wearable device according to an embodiment may display a first screen (e.g., the first screen 110 of FIG. 1, the first screen 510 of FIG. 5, and/or the first screen 610 of FIG. 6) with respect to a virtual space on a display. For example, the first screen with respect to the virtual space may be displayed based on execution of a software application associated with the virtual space. The wearable device may identify an event for displaying a second screen (e.g., the second screen 120 of FIG. 1 and/or the second screen 520 of FIG. 5) different from the first screen while displaying the first screen.

In an operation 1103, the wearable device according to an embodiment may identify an event for switching to the second screen distinguished from the virtual space in a state in which the first screen is displayed. The wearable device may switch the first screen to the second screen in response to the event for switching to the second screen. For example, the second screen may be a screen for representing a second virtual space different from a first virtual space associated with the first screen, such as a home screen and/or a home virtual space.

In an operation 1105, according to an embodiment, the wearable device may display the second screen. The wearable device may display a visual object (e.g., the visual object 130 of FIG. 1, the visual object 530 of FIG. 5, and/or the visual object 630 of FIG. 6) representing at least a portion of the virtual space together with the second screen. For example, the virtual space may be a virtual space associated with the first screen. The wearable device may display the visual object having a size smaller than the second screen and indicating at least a portion of the virtual space.

As described above, the wearable device according to an embodiment may display the visual object representing the virtual space in the second screen. For example, the visual object representing the virtual space may be a visual object for indicating at least a portion of the first screen. The wearable device may display a plurality of virtual spaces in the display by displaying the visual object together with the second screen. The wearable device may enhance user experience of the wearable device by displaying the plurality of virtual spaces in a single display.

FIG. 12 is a flowchart illustrating an example operation of a wearable device according to various embodiments. The wearable device of FIG. 12 may include the wearable device 101 of FIGS. 1, 2, 5, 6, 7, and 8 and/or the wearable device of FIGS. 9, 10 and/or 11. The wearable device of FIG. 12 may include the wearable device 300 of FIGS. 3A and 3B and/or the wearable device 400 of FIGS. 4A and 4B. Operations of FIG. 12 may be performed by the processor 210 of FIG. 2.

Referring to FIG. 12, in an operation 1201, the wearable device according to an embodiment may identify an event for switching to a second screen (e.g., the second screen 120 of FIG. 1 and/or the second screen 520 of FIG. 5) in a state displaying a first screen (e.g., the first screen 110 of FIG. 1, the first screen 510 of FIG. 5, and/or the first screen 610 of FIG. 6) associated with a virtual space. The wearable device may switch the first screen displayed on a display to the second screen in response to the event.

In an operation 1203, the wearable device according to an embodiment may display a visual object (e.g., the visual object 130 of FIG. 1, the visual object 530 of FIG. 1, and/or the visual object 630 of FIG. 6) having a size smaller than the second screen and indicating at least a portion of the virtual space, together with the second screen displayed on the display. For example, the visual object may be a visual object representing at least a portion of the first screen and/or the virtual space.

In an operation 1205, the wearable device according to an embodiment may display an avatar of a user of the wearable device associated with the virtual space together in the visual object indicating at least a portion of the virtual space. For example, the avatar may be an avatar set by the wearable device. For example, the avatar may be an avatar of the virtual space. For example, the wearable device may identify an input with respect to the visual object while displaying the visual object including the avatar. For example, while displaying the visual object, the wearable device may use the avatar to notify an event generated in the virtual space. For example, the wearable device may notify the event by moving the avatar or controlling an action of the avatar.

In an operation 1207, the wearable device according to an embodiment may display the first screen associated with the virtual space based on the input with respect to the visual object. For example, the wearable device may identify the input with respect to the visual object while displaying the visual object together with the second screen. The wearable device may switch from the second screen to the first screen based on the input.

As described above, while displaying the second screen, the wearable device according to an embodiment may display the visual object indicating at least a portion of the virtual space associated with the first screen. The wearable device may identify the input with respect to the visual object while displaying the second screen. The wearable device may switch from the second screen to the first screen based on identifying the input. The wearable device may enhance user experience of the wearable device by switching the first screen and the second screen based on an input of the user.

FIG. 13 is a flowchart illustrating an example operation of a wearable device according to various embodiments. The wearable device of FIG. 13 may include the wearable device 101 of FIGS. 1, 2, 5, 6, 7, and 8 and/or the wearable device of FIGS. 9, 10, 11 and/or 12. The wearable device of FIG. 12 may include the wearable device 300 of FIGS. 3A and 3B and/or the wearable device 400 of FIGS. 4A and 4B. Operations of FIG. 13 may be performed by the processor 210 of FIG. 2. The following application may be substantially the same as the above-described software application.

Referring to FIG. 13, in an operation 1301, the wearable device according to an embodiment may display a first screen (e.g., the first screen 110 of FIG. 1, the first screen 510 of FIG. 5, and/or the first screen 610 of FIG. 6) with respect to a first view point of a virtual space provided from a first application on a display (e.g., the display 230 of FIG. 2). For example, the first screen may be displayed while a position of the wearable device identified by a sensor is included in a first range. For example, the wearable device may display the first screen based on the position of the wearable device identified in the first range matching a circle such as a concentric circle. For example, the wearable device may display the first screen based on the position of the wearable device identified in the first range matching a polygon. However, the disclosure is not limited thereto. For example, the sensor may include an acceleration sensor, a geomagnetic sensor, a gyro sensor, and/or an image sensor. For example, the wearable device may identify the position of the wearable device based on the sensor. The wearable device may identify the position of the wearable device based on data obtained through the sensor. For example, the wearable device may identify the position of the wearable device based on a change in images obtained by the image sensor. An operation of identifying the position of the wearable device is not limited to what has been described above. For example, the first range may be preset by a user. For example, the first view point may be a first-person view point of a character, and/or an avatar, controlled by a user of the wearable device while the first application is being executed. However, the disclosure is not limited thereto.

In an operation 1303, the wearable device according to an embodiment may identify that the position of the wearable device is moved to a second range distinguished from the first range for displaying the first screen using the sensor in a state displaying the first screen. For example, the second range may be outside the first range. The wearable device may switch the first screen displayed on the display to a second screen (e.g., the second screen 120 of FIG. 1 and/or the second screen 520 of FIG. 5) provided from a second application, in response to the position of the wearable device identified in the second range. The wearable device may switch the first screen displayed on the display to the second screen in response to identifying that the position of the wearable device is moved to the second range distinguished from the first range for displaying the first screen using the sensor in the state displaying the first screen.

In an operation 1305, the wearable device according to an embodiment may display a visual object (e.g., the visual object 130 of FIG. 1, the visual object 530 of FIG. 5, and/or the visual object 630 of FIG. 6) representing the virtual space at a second view point distinguished from the first view point, together with the second screen displayed on the display. For example, the second viewpoint may be a third-person view point of the character and/or the avatar controlled by the wearable device. However, the disclosure is not limited thereto. For example, the visual object may include an icon. For example, the visual object may include at least a portion of the first screen.

The wearable device according to an embodiment may be referred to as an electronic device. The electronic device may form an HMD, by being coupled with an accessory for being attached to a head of the user. For example, the electronic device forming the HMD may provide extended reality while coupled with the accessory. For example, the electronic device may display the first screen based on execution of the first application while providing the extended reality. For example, the first application may include an application for representing the virtual space in the extended reality. The wearable device may identify an event for switching to the second screen different from the first screen while displaying the first screen. The wearable device may display the second screen representing the second application in response to the event. For example, the second application may include an application for displaying a home screen. For example, the second application may include an application for representing a second virtual space different from a first virtual space provided by the first application.

As described above, the wearable device according to an embodiment may display the first screen with respect to the first view point of the virtual space provided from the first application. For example, the wearable device may display the first screen while the position of the wearable device is included in the first range. The wearable device may switch the first screen to the second screen provided from the second application in response to identifying that the position of the wearable device is moved to the second range different from the first range in the state displaying the first screen. The wearable device may display the visual object representing the virtual space at the second view point distinguished from the first view point together with the second screen. The wearable device may enhance user experience of the wearable device by displaying the visual object representing at least a portion of the first application together with the second screen.

Metaverse is a compound word of the English words "Meta" referring, for example, to "virtual" and "transcendence" and "Universe" referring, for example, to cosmos, and refers to a three-dimensional virtual world in which social, economic, and cultural activities take place like a real world. Metaverse is a concept that has evolved one step further than a virtual reality (VR, cutting-edge technology that enables people to experience real-life experiences in a virtual world created by a computer), and it is characterized using avatars to not only enjoy games or virtual reality, but also social and cultural activities like a reality. A metaverse service may provide media content for enhancing immersion in the virtual world, based on an augmented reality (AR), a virtual reality environment (VR), a mixed environment (MR), and/or an extended reality (XR).

For example, media content provided by the metaverse service may include social interaction content including avatar-based game, concert, party, and/or meeting. For example, the media content may include information for economic activities such as advertising, user created content, and/or sales and/or shopping of productions. Ownership of the user created content may be proved by a blockchain-based non-fungible token (NFT). The metaverse service may support economic activities based on real money and/or cryptocurrency. By the metaverse service, virtual content associated with the real world, such as digital twin or life logging, may be provided.

FIG. 14 is a diagram illustrating an example of a network environment 1401 in which a metaverse service is provided through a server 1410 according to various embodiments.

Referring to FIG. 14, a network environment 1401 may include a server 1410, a user terminal 1420 (e.g., a first terminal 1420-1 and a second terminal 1420-2), and a network connecting the server 1410 and the user terminal 1420. In the network environment 1401, the server 1410 may provide a metaverse service to the user terminal 1420. The network may be formed by at least one intermediate node 1430 including an access point (AP) and/or a base station. The user terminal 1420 may access the server 1420 through the network and output a user interface (UI) associated with a metaverse service to a user of the user terminal 1420. Based on the UI, the user terminal 1420 may obtain information to be input into the metaverse service from the user, or output information (e.g., multimedia content) associated with the metaverse service to the user.

In this case, the server 1410 provides a virtual space so that the user terminal 1420 may perform activities in the virtual space. In addition, the user terminal 1420 may represent information provided by the server 1410 to the user by installing an S/W (e.g., software) agent to access the virtual space provided by the server 1410, or transmit information that the user wants to represent in the virtual space to the server. The S/W agent may be provided directly through the server 1410, downloaded from a public server, or embedded and provided when purchasing a terminal.

In an embodiment, the metaverse service may provide a service to the user terminal 1420 and/or a user using the server 1410. The disclosure is not limited thereto, and the metaverse service may be provided through individual contacts between users. For example, in the network environment 1401, the metaverse service may be provided by a direct connection between the first terminal 1420-1 and the second terminal 1420-2, independently of the server 1410. Referring to FIG. 14, in the network environment 1401, the first terminal 1420-1 and the second terminal 1420-2 may be connected to each other through a network formed by at least one intermediate node 1430. In an embodiment in which the first terminal 1420-1 and the second terminal 1420-2 are directly connected, any one of the first terminal 1420-1 and the second terminal 1420-2 may perform a role of the server 1410. For example, a metaverse environment may be configured only with a device-to-device connection (e.g., a peer-to-peer (P2P) connection).

In an embodiment, the user terminal 1420 (or the user terminal 1420 including the first terminal 1420-1 and the second terminal 1420-2) may be made in various form factors, and it is characterized by including an output device for providing an image and/or sound to the user and an input device for inputting information into the metaverse service. An example user terminal 1420 in various form factors may include a smartphone (e.g., the second terminal 1420-2), an AR device (e.g., the first terminal 1420-1), a VR device, an MR device, a Video See Through (VST) device, an Optical See Through (OST) device, a smart lens, a smart mirror, a TV capable of inputting and outputting, or a projector.

A network (e.g., a network formed by at least one intermediate node 1430) includes all of various broadband networks including 3G, 4G, and 5G and short-range networks (e.g., a wired network or a wireless network that directly connects the first terminal 1420-1 and the second terminal 1420-2) including Wi-Fi and BT.

While switching from a first screen representing a virtual space to a second screen, a method for displaying a visual object to indicate the virtual space may be required.

As described above, according to an example embodiment, an electronic device may comprise a display, a sensor, memory for storing instructions, and at least one processor, comprising processing circuitry, wherein at least one processor, individually and/or collectively, may be configured to execute the and to cause the electronic device to: while executing a first application to provide a virtual space, detect a direction of the electronic device using the sensor; display, in an entire displaying area of the display, a first screen corresponding to a portion of the virtual space corresponding to the detected direction of the electronic device; determine, using the sensor, whether a position of the electronic device is included in a first range to maintain providing a virtual reality service based on the virtual space; based on detecting the position of the electronic device included in a second range different from the first range, display, in the entire displaying area of the display, a second screen provided from a second application; and display, on the second screen, a visual object associated with the virtual space having a size reduced based on a portion of the displaying area, on the second screen.

For example, the visual object may include icons respectively representing a plurality of virtual objects positioned in the virtual space.

For example, the electronic device may comprise a camera. At least one processor, individually and/or collectively, may be configured to cause the electronic device to, based on detecting the position of the electronic device included in the second range, display the second screen including an image output from the camera.

For example, at least one processor, individually and/or collectively, may be configured to cause the electronic device to, based on at least temporary cessation of the first application to display the first screen, display the second screen.

For example, at least one processor, individually and/or collectively, may be configured to cause the electronic device to display the visual object having a shape of a hemisphere, and including an image with respect to the virtual space positioned on a curved surface of the hemisphere.

For example, at least one processor, individually and/or collectively, may be configured to cause the electronic device to, based on detecting an event associated with at least one of the virtual space or the first application, notify the event using the visual object.

For example, at least one processor, individually and/or collectively, may be configured to cause the electronic device to, based on an input with respect to the visual object, display the virtual space in at least portion of the second screen.

For example, at least one processor, individually and/or collectively, may be configured to cause the electronic device to display an avatar associated with the virtual space in the visual object.

For example, at least one processor, individually and/or collectively, may be configured to cause the electronic device to: in a first state displaying the visual object, at least temporary cease the first application associated with the visual object. The instructions, when executed by the processor, may cause the electronic device to, in a second state different from the first state, terminate the first application.

As described above, in an example embodiment, a method of operating a wearable device including a display and a sensor may be provided. The method may comprise: while executing a first application to provide a virtual space, detecting a direction of the electronic device using the sensor; displaying, in an entire displaying area of the display, a first screen corresponding to a portion of the virtual space corresponding to the detected direction of the electronic device; determining, using the sensor, whether a position of the electronic device is included in a first range to maintain providing a virtual reality service based on the virtual space; based on detecting the position of the electronic device included in a second range different from the first range, displaying, in the entire displaying area of the display, a second screen provided from a second application; and displaying, on the second screen, a visual object associated with the virtual space having a size reduced based on a portion of the displaying area, on the second screen.

For example, the visual object may include icons respectively representing a plurality of virtual objects positioned in the virtual space.

For example, the method may comprise, based on detecting the position of the electronic device included in the second range, displaying the second screen including an image output from the camera.

For example, the method may comprise, based on at least temporary cessation of the first application to display the first screen, displaying the second screen.

For example, the method may comprise displaying the visual object having a shape of a hemisphere, and including an image with respect to the virtual space positioned on a curved surface of the hemisphere.

For example, the method may comprise based on detecting an event associated with at least one of the virtual space or the first application, notifying the event using the visual object.

As described above, in an embodiment, a non-transitory computer-readable storage medium storing one or more programs may be provided. The one or more programs, when executed by at least one processor, comprising processing circuitry, individually and/or collectively, of an electronic device including a display and a sensor, may cause the electronic device to perform operations comprising: while executing a first application to provide a virtual space, detecting a direction of the electronic device using the sensor; displaying, in an entire displaying area of the display, a first screen corresponding to a portion of the virtual space corresponding to the detected direction of the electronic device; determining, using the sensor, whether a position of the electronic device is included in a first range to maintain providing a virtual reality service based on the virtual space; based on detecting the position of the electronic device included in a second range different from the first range, displaying, in the entire displaying area of the display, a second screen provided from a second application; and displaying, on the second screen, a visual object associated with the virtual space having a size reduced based on a portion of the displaying area, on the second screen.

As described above, according to an example embodiment, an electronic device may comprise: a display, a sensor, memory storing instructions, and at least one processor, comprising processing circuitry, individually and/or collectively, configured to execute the instructions and to cause the electronic device to: display, on the display, a first screen with respect to a first view point of a virtual space provided from a first application, wherein the first screen may be displayed while a position of the electronic device identified by the sensor is included in a first range; in a state displaying the first screen, switch the first screen displayed on the display into a second screen provided from the second application, in response to identifying that the position of the electronic device is moved to a second range distinguished from the first range for displaying the first screen using the sensor; and together with the second screen displayed on the display, display a visual object representing the virtual space at a second view point distinguished from the first view point.

According to an example embodiment, the electronic device may comprise a sensor. At least one processor, individually and/or collectively, may be configured to cause the electronic device to: identify a first range for displaying the first screen based on the sensor; and identify an event based on the position of the electronic device identified in a second range indicating outside the first range.

According to an example embodiment, the visual object may include an icon representing the virtual space.

According to an example embodiment, the electronic device may comprise a camera. At least one processor, individually and/or collectively, may be configured to cause the electronic device to, based on identifying the event, display the second screen including an image output from the camera.

According to an example embodiment, at least one processor, individually and/or collectively, may be configured to cause the electronic device to, based on at least temporary cessation of an application for displaying the first screen, identify the event.

According to an example embodiment, at least one processor, individually and/or collectively, may be configured to cause the electronic device to, based on an input for adjusting a size of the visual object, adjust the size of the visual object.

According to an example embodiment, at least one processor, individually and/or collectively, may be configured to cause the electronic device to, based on identifying a second event occurring in the virtual space and being different from the event, which is a first event, notify using the visual object.

According to an example embodiment, at least one processor, individually and/or collectively, may be configured to cause the electronic device to, based on an input with respect to the visual object, display the virtual space on at least a portion of the second screen.

According to an example embodiment, at least one processor, individually and/or collectively, may be configured to cause the electronic device to display an avatar associated with the virtual space in the visual object.

According to an example embodiment, at least one processor, individually and/or collectively, may be configured to cause the electronic device to, in a first state displaying the visual object, at least temporarily cease the first application associated with the visual object; and in a second state different from the first state, terminate the first application.

As described above, according to an example embodiment, a method of operating an electronic device may comprise: displaying, on a display, a first screen with respect to a first view point of a virtual space provided from a first application, wherein the first screen may be displayed while a position of the electronic device identified by a sensor is included in a first range; in a state displaying the first screen, switching the first screen displayed on the display to a second screen provided from a second application, in response to identifying that the position of the electronic device is moved to a second range distinguished from the first range for displaying the first screen using the sensor; and together with the second screen displayed on the display, displaying a visual object representing the virtual space at a second view point distinguished from the first view point.

According to an example embodiment, the visual object may include an icon for representing the virtual space.

According to an example embodiment, the method may comprise: identifying a first range for displaying the first screen based on a sensor; and identifying an event based on the position of the electronic device identified in a second range indicating outside the first range.

According to an example embodiment, the method may comprise, based on identifying the event, displaying the second screen including an image output from the camera.

According to an example embodiment, the method may comprise, based on at least temporary cessation of an application for displaying the first screen, identifying the event.

According to an example embodiment, the method may comprise, based on an input for adjusting a size of the visual object, adjusting the size of the visual object.

According to an example embodiment, the method may comprise, based on identifying a second event that occurs in the virtual space and is different from the event, which is a first event, notifying using the visual object.

According to an example embodiment, the method may comprise, based on an input with respect to the visual object, displaying the virtual space on at least a portion of the second screen.

According to an example embodiment, the method may comprise displaying an avatar associated with the virtual space in the visual object.

According to an example embodiment, the method may comprise: in a first state displaying the visual object, at least temporarily ceasing the first application associated with the visual object; and in a second state different from the first state, terminating the first application.

As described above, according to an example embodiment, in a non-transitory computer-readable storage medium storing one or more programs, the one or more programs, when executed by at least one processor, comprising processing circuitry, individually and/or collectively, of a wearable device, may cause the wearable device to: display, on a display, a first screen with respect to a virtual space; in response to an event for switching to a second screen distinguished from the virtual space, in a state displaying the first screen, switch the first screen displayed on the display to the second screen; and together with the second screen displayed on the display, to display a visual object having a size smaller than the second screen and indicating at least a portion of the virtual space.

According to an example embodiment, the one or more programs, when executed by at least one processor, individually and/or collectively, of the wearable device, may cause the wearable device to: identify a first range for displaying the first screen based on a; and identify the event based on the position of the electronic device 101 identified in a second range indicating outside the first range.

According to an example embodiment, the one or more programs, when executed by at least one processor, individually and/or collectively, of the wearable device, may cause the wearable device to, based on identifying the event, display the second screen including an image output from the camera.

According to an example embodiment, the one or more programs, when executed by at least one processor, individually and/or collectively, of the wearable device, may cause the wearable device to, based on at least temporary cessation of an application for displaying the first screen, identify the event.

The electronic device according to various embodiments may be one of various types of electronic devices. The electronic devices may include, for example, a portable communication device (e.g., a smartphone), a computer device, a portable multimedia device, a portable medical device, a camera, an electronic device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," or "connected with" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software including one or more instructions that are stored in a storage medium that is readable by a machine (e.g., the electronic device 101). For example, a processor (e.g., the processor 210) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between a case in which data is semi-permanently stored in the storage medium and a case in which the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various modifications, variations and alternatives may be made without departing from the true spirit and full scope of the disclosure, including the appended claims and their equivalents. It will also be understood that any of the embodiment(s) described herein may be used in conjunction with any other embodiment(s) described herein.

No claim element is to be construed under the provisions of 35 U.S.C. § 112, sixth paragraph, unless the element is expressly recited using the phrase "means for" or "means."

What is claimed is:
1. An electronic device comprising:
a display;
a sensor;
memory comprising one or more storage media storing instructions; and
at least one processor, comprising processing circuitry;
wherein the instructions, when executed by at least one processor individually and/or collectively, cause the electronic device to:
while executing a first application to provide a virtual space, detect a direction of the electronic device using the sensor;
display, in an entire displaying area of the display, a first screen corresponding to a portion of the virtual space corresponding to the detected direction of the electronic device;
determine, using the sensor, whether a position of the electronic device is included in a first range to maintain providing a virtual reality service based on the virtual space;

based on detecting the position of the electronic device included in a second range different from the first range:

display, in the entire displaying area of the display, a second screen provided from a second application; and display, on the second screen, a visual object associated with the virtual space having a size reduced based on a portion of the displaying area, on the second screen.

2. The electronic device of claim 1, wherein the visual object includes icons respectively representing a plurality of virtual objects positioned in the virtual space.

3. The electronic device of claim 1, further comprising a camera, and wherein the instructions, when executed by at least one processor individually or collectively, cause the electronic device to:

based on detecting the position of the electronic device included in the second range, display the second screen including an image output from the camera.

4. The electronic device of claim 1, wherein the instructions, when executed by at least one processor individually or collectively, cause the electronic device to:

based on at least temporary cessation of the first application to display the first screen, display the second screen.

5. The electronic device of claim 1, wherein the instructions, when executed by at least one processor individually or collectively, cause the electronic device to:

display the visual object having a shape of a hemisphere, and including an image with respect to the virtual space positioned on a curved surface of the hemisphere.

6. The electronic device of claim 1, wherein the instructions, when executed by at least one processor individually or collectively, cause the electronic device to:

based on detecting an event associated with at least one of the virtual space or the first application, notify the event using the visual object.

7. The electronic device of claim 1, wherein the instructions, when executed by at least one processor individually or collectively, cause the electronic device to:

based on an input with respect to the visual object, display the virtual space in at least portion of the second screen.

8. The electronic device of claim 1, wherein the instructions, when executed by at least one processor individually or collectively, cause the electronic device to:

display an avatar associated with the virtual space in the visual object.

9. The electronic device of claim 1, wherein the instructions, when executed by at least one processor individually or collectively, cause the electronic device to:

in a first state of displaying the visual object, at least temporarily cease the first application associated with the visual object; and in a second state different from the first state, terminate the first application.

10. A method of operating a wearable device including a display and a sensor, comprising:

while executing a first application to provide a virtual space, detecting a direction of the electronic device using the sensor;

displaying, in an entire displaying area of the display, a first screen corresponding to a portion of the virtual space corresponding to the detected direction of the electronic device;

determining, using the sensor, whether a position of the electronic device is included in a first range to maintain providing a virtual reality service based on the virtual space;

based on detecting the position of the electronic device included in a second range different from the first range:

displaying, in the entire displaying area of the display, a second screen provided from a second application; and displaying, on the second screen, a visual object associated with the virtual space having a size reduced based on a portion of the displaying area, on the second screen.

11. The method of claim 10, wherein the visual object includes icons respectively representing a plurality of virtual objects positioned in the virtual space.

12. The method of claim 10, further comprising:

based on detecting the position of the electronic device included in the second range, displaying the second screen including an image output from the camera.

13. The method of claim 10, further comprising:

based on at least temporary cessation of the first application to display the first screen, displaying the second screen.

14. The method of claim 10, further comprising:

displaying the visual object having a shape of a hemisphere, and including an image with respect to the virtual space positioned on a curved surface of the hemisphere.

15. A non-transitory computer-readable storage medium storing one or more programs, wherein the one or more programs, when executed by at least one processor, comprising processing circuitry, individually and/or collectively, of an electronic device including a display and a sensor, cause the electronic device to:

while executing a first application to provide a virtual space, detect a direction of the electronic device using the sensor;

display, in an entire displaying area of the display, a first screen corresponding to a portion of the virtual space corresponding to the detected direction of the electronic device;

determine, using the sensor, whether a position of the electronic device is included in a first range to maintain providing a virtual reality service based on the virtual space;

based on detecting the position of the electronic device included in a second range different from the first range:

display, in the entire displaying area of the display, a second screen provided from a second application; and display, on the second screen, a visual object associated with the virtual space having a size reduced based on a portion of the displaying area, on the second screen.

16. The non-transitory computer-readable storage medium of claim 15, wherein the visual object includes icons respectively representing a plurality of virtual objects positioned in the virtual space.

17. The non-transitory computer-readable storage medium of claim 15, wherein the one or more programs, when executed by at least one processor, individually and/or collectively, of the electronic device including a camera, cause the electronic device to:

based on detecting the position of the electronic device included in the second range, display the second screen including an image output from the camera.

18. The non-transitory computer-readable storage medium of claim 15, wherein the one or more programs, when executed by at least one processor, individually and/or collectively, of the electronic device, cause the electronic device to:

based on at least temporary cessation of the first application to display the first screen, display the second screen.

19. The non-transitory computer-readable storage medium of claim 15, wherein the one or more programs, when executed by at least one processor, individually and/or collectively, of the electronic device, cause the electronic device to:

display the visual object having a shape of a hemisphere, and including an image with respect to the virtual space positioned on a curved surface of the hemisphere.

20. The non-transitory computer-readable storage medium of claim 15, wherein the one or more programs, when executed by at least one processor, individually and/or collectively, of the electronic device, cause the electronic device to:

based on detecting an event associated with at least one of the virtual space or the first application, notify the event using the visual object.

\* \* \* \* \*